US010257543B2

(12) United States Patent
Guo et al.

(10) Patent No.: US 10,257,543 B2
(45) Date of Patent: Apr. 9, 2019

(54) IDENTIFICATION OF SAMPLES IN A TRANSITION ZONE

(71) Applicant: QUALCOMM Incorporated, San Diego, CA (US)

(72) Inventors: Liwei Guo, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/794,507

(22) Filed: Oct. 26, 2017

(65) Prior Publication Data

US 2018/0103273 A1 Apr. 12, 2018

Related U.S. Application Data

(63) Continuation of application No. 13/311,834, filed on Dec. 6, 2011, now Pat. No. 9,807,424.

(Continued)

(51) Int. Cl.
*H04N 19/86* (2014.01)
*H04N 19/80* (2014.01)
(Continued)

(52) U.S. Cl.
CPC ........... *H04N 19/86* (2014.11); *H04N 19/117* (2014.11); *H04N 19/127* (2014.11);
(Continued)

(58) Field of Classification Search
CPC .... H04N 19/86; H04N 19/117; H04N 19/127; H04N 19/159; H04N 19/17; H04N 19/176; H04N 19/80
(Continued)

(56) References Cited

U.S. PATENT DOCUMENTS 5,602,593 A 2/1997 Katto
5,649,032 A 7/1997 Burt et al.
(Continued)

FOREIGN PATENT DOCUMENTS

CN 1812580 A 8/2006
CN 101523922 A 9/2009
(Continued)

OTHER PUBLICATIONS

Auwera G et al., "CE6.b: SDIP Harmonization with Deblocking, MDIS and HE Residual Coding", 6. JCT-VC Meeting; 97. MPEG Meeting; Jul. 14, 2011-Jul. 22, 2011; Torino; (Joint Collaborative Team on Video Coding of ISO / IEC JTC1/SC29/WG11 and ITU-T SG.16); URL:http://phenix.it-sudparis.eu/jct/doc_end_user/documents/6_Torino/wg11/JCTVC-F556-v3.zipno. JCTVC-F556, Jul. 17, 2011 (Jul. 17, 2011), XP030009579.

(Continued)

*Primary Examiner* — Christopher S Kelley
*Assistant Examiner* — Matthew K Kwan
(74) *Attorney, Agent, or Firm* — Shumaker & Sieffert, P.A.

(57) ABSTRACT

During a video encoding or decoding process, a predicted prediction block is generated for a CU. The CU may have two or more prediction units (PUs). A computing device selects a neighbor region size. After the computing device selects the neighbor region size, samples in a transition zone of the prediction block are identified. Samples associated with a first PU are in the transition zone if neighbor regions that contain the samples also contain samples associated with a second PU. Samples associated with the second PU may be in the transition zone if neighbor regions that contain the samples also contain samples associated with the first PU. The neighbor regions have the selected neighbor region (Continued)

US 10,257,543 B2

Page 2 size. A smoothing operation is then performed on the samples in the transition zone.

59 Claims, 21 Drawing Sheets

Related U.S. Application Data

(60) Provisional application No. 61/431,408, filed on Jan. 10, 2011, provisional application No. 61/450,532, filed on Mar. 8, 2011, provisional application No. 61/450,538, filed on Mar. 8, 2011, provisional application No. 61/537,450, filed on Sep. 21, 2011.

(51) Int. Cl.
*H04N 19/17* (2014.01)
*H04N 19/127* (2014.01)
*H04N 19/117* (2014.01)
*H04N 19/176* (2014.01)
*H04N 19/159* (2014.01)

(52) U.S. Cl.
CPC ........... *H04N 19/159* (2014.11); *H04N 19/17* (2014.11); *H04N 19/176* (2014.11); *H04N 19/80* (2014.11)

(58) Field of Classification Search
USPC ..................................................... 375/240.16
See application file for complete search history.

(56) References Cited

U.S. PATENT DOCUMENTS

| | | | |
|---|---|---|---|
| 5,818,969 A | 10/1998 | Astle | |
| 6,868,114 B2 | 3/2005 | Bially et al. | |
| 7,242,815 B2 | 7/2007 | Kalevo et al. | |
| 7,426,315 B2 | 9/2008 | Frishman et al. | |
| 7,570,832 B2 | 8/2009 | Chui et al. | |
| 7,747,094 B2 | 6/2010 | Sekiguchi et al. | |
| 8,169,216 B2 | 5/2012 | Yanasak | |
| 8,340,458 B2 | 12/2012 | Fang | |
| 8,542,750 B2 | 9/2013 | Cha et al. | |
| 8,848,783 B2 | 9/2014 | Kim et al. | |
| 8,879,631 B2 | 11/2014 | Shields et al. | |
| 9,020,030 B2 | 4/2015 | Chen et al. | |
| 9,071,851 B2 | 6/2015 | Guo et al. | |
| 9,807,424 B2 | 10/2017 | Guo et al. | |
| 2002/0057741 A1* | 5/2002 | Lainema | H04N 19/147 375/240.16 |
| 2002/0164084 A1 | 11/2002 | Baggs | |
| 2003/0016371 A1 | 1/2003 | Shaw | |
| 2003/0039310 A1* | 2/2003 | Wu | G06T 5/002 375/240.16 |
| 2004/0184666 A1* | 9/2004 | Sekiguchi | H04N 19/139 382/236 |
| 2005/0243912 A1 | 11/2005 | Kwon et al. | |
| 2005/0265451 A1 | 12/2005 | Shi et al. | |
| 2006/0013311 A1 | 1/2006 | Han | |
| 2006/0083310 A1 | 4/2006 | Zhang | |
| 2006/0193388 A1 | 8/2006 | Woods et al. | |
| 2007/0071100 A1 | 3/2007 | Shi et al. | |
| 2007/0223582 A1 | 9/2007 | Borer | |
| 2008/0050029 A1 | 2/2008 | Bashyam et al. | |
| 2008/0089417 A1 | 4/2008 | Bao et al. | |
| 2008/0152008 A1 | 6/2008 | Sun et al. | |
| 2008/0309817 A1 | 12/2008 | Huang et al. | |
| 2008/0310504 A1 | 12/2008 | Ye et al. | |
| 2009/0046781 A1 | 2/2009 | Moriya et al. | |
| 2009/0086814 A1 | 4/2009 | Leontaris et al. | |
| 2010/0118959 A1 | 5/2010 | Lou et al. | |
| 2010/0138218 A1 | 6/2010 | Geiger | |
| 2010/0208827 A1* | 8/2010 | Divorra Escoda | H04N 19/176 375/240.24 |
| 2010/0284467 A1 | 11/2010 | Sekiguchi et al. | |
| 2010/0329362 A1 | 12/2010 | Choi et al. | |
| 2011/0142132 A1 | 6/2011 | Tourapis et al. | |
| 2012/0106627 A1 | 5/2012 | Guo et al. | |
| 2012/0147961 A1 | 6/2012 | Guo et al. | |
| 2013/0034165 A1 | 2/2013 | Sasai et al. | |

FOREIGN PATENT DOCUMENTS

| | | | |
|---|---|---|---|
| CN | 101848391 A | | 9/2010 |
| CN | 101878486 A | | 11/2010 |
| EP | 1404136 A1 | | 3/2004 |
| EP | 1677545 A2 | | 7/2006 |
| JP | 2012070277 A | | 4/2012 |
| JP | 5705833 B2 | | 4/2015 |
| WO | 03003749 A1 | | 1/2003 |
| WO | 05109899 | | 11/2005 |
| WO | 2008048864 A2 | | 4/2008 |
| WO | 2010044559 | | 4/2010 |
| WO | 2010151334 A1 | | 12/2010 |
| WO | 2011103210 | | 8/2011 |
| WO | 2011129100 A1 | | 10/2011 |

OTHER PUBLICATIONS

Bossen F., "Common test conditions and software reference configurations," Document No. JCTVC-O500, WG11 No. m18607, Joint Collaborative Team on Video Coding (JCT-VC) of ITU-T SG16 WP3 and ISO/IEC JTC1/SC29/WG11, 3rd Meeting, Guangzhou; CN, Oct. 7-15, 2010, 4 pages.

Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, JCTVC-L1100, 4 Pages.

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, XP030112373, (May 10, 2012), pp. 1-290.

Bross, B., et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d9, 280 pp.

Bross B., et al., "High Efficiency Video Coding (HEVC) text specification draft 8", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen J., et al., "Coding Tools Investigation for Next Generation Video Coding, C 806", ITU-T Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].

(56) References Cited

OTHER PUBLICATIONS

Chen P et al: "Geometry motion partition", 2. JCT-VC Meeting; Jul. 21, 2010-Jul. 28, 2010; Geneva; (Joint Collaborativeteam on Video Coding of ISO/IEC JTC1/SC29/WG11 and ITU-T SG.16); URL:http://wftp3.itu.int/av-arch/jctvc-site/ No. JCTVC-B049, Jul. 23, 2010 (Jul. 23, 2010), XP030007629, ISSN: 000-0048, the whole document.

Chen P., et al., "Overlapped block motion compensation in TMuC", 3. JCT-VC Meeting; 94. MPEG Meeting; Oct. 7, 2010-Oct. 15, 2010; Guangzhou; (Joint Collaborative Team on Videocoding of ISO/IECJTC1/SC29/WG11 and ITU-T SG.16); URL: http://wftp3.1tu.int/av-arch/jctvc-sitei, No. JCTV-C251, Oct. 2, 2010 (Oct. 2, 2010), XP030007958, ISSN: 0000-0019.

Cheon M-S., et al., "CE2: Asymmetric motion partition with overlapped block motion compensation," Document No. JCTVC-D367, Joint Collaborative Team on Video Coding (JCT-VC) of ITU-T SG16 WP3 and ISO/IEC JTC1/SC29/WG11, 4th Meeting, Daegu, KR, Jan. 20-28, 2011, 4 pages.

Cheong, "Fast Motion Estimation for the JVT Code," 5. JVT Meeting, Oct. 14, 2002 to Oct. 18, 2002, Geneva, CH, Joint Video Team of ISO/IEC JTC1/SC29/WG11 and ITU-T SG.16, No. JVT-E023, Oct. 18, 2002, XP030005440, ISSN: 0000-0438.

Escoda D., et al.,"Geometry-Adaptive Block Partitioning for Video Coding", 2007 IEEE International Conference on Acoustics, Speech, and Signal Processing Apr. 15-20, 2007, Honolulu, HI, USA, IEEE, Piscataway, NJ, USA, Apr. 15, 2007 (Apr. 15, 2007), pp. 1-657, ISBN: 978-1-4244-0727-9.

Ferreira, et al., "Efficienty Improvements for a Geometric-Partition-Based Video Coder," Proceedings of the 2009 16th IEEE International Conference on Image Processing (ICIP 2009), pp. 1009-1012.

Francois E., et al., "CE2: Simplified Geometry Block Partitioning," Document No. JCTVC-D230, WG11 No. m18990, Joint Collaborative Team on Video Coding (JCT-VC) of ITU-T SG16 WP3 and ISO/IEC JTC1/SC29/WG11, 4th Meeting, Daegu, KR, Jan. 20-28, 2011, 7 pages.

Guo, et al., "Simplified geometry-adaptive block partitioning for video coding," 2010 17th IEEE International Conference on Image Processing (ICIP), Sep. 26-29, 2010, pp. 965-968.

Guo L., et al., "CE2: Overlapped Block Motion Compensation", 7. JCT-VC Meeting, 98 MPEG Meeting, Nov. 21, 2011-Nov. 30, 2011, Geneva, Joint Collaborative Team on Video Coding of ISO/IEC JTC1/SC29/WG11 and ITU-T SG.16, URL: http://wftp3.itu.int/av-arch/jctvc-site/No. JCTVC-G749, Nov. 9, 2011, XP030110733, 8 pages.

Guo L., et al., "CE2: Overlapped Block Motion Compensation", 98, MPEG Meeting; Nov. 28, 2011-Dec. 2, 2011; Geneva; (Motion Picture Expert Group of ISO/IEC JTC1/SC29/WG11),, No. m22319, Nov. 18, 2011 (Nov. 18, 2011), XP030050882.

Guo L. et al., "CE2: Overlapped Block Motion Compensation for 2NxN and Nx2N Motion Partitions", 97. MPEG Meeting; Jul. 14,2011-Jul. 22, 2011; Torino; (Motion Picture Expert Group or ISO/IEC JTC1/SC29/WG11), No. m20720, JCTVC-F299, Jul. 15, 2011, XP030049283, 7 pages.

Guo L, et al., "CE2: Overlapped Block Motion Compensation for Geometry Partition Block", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11and ITU-TSG.16); URL: htip:/iwftp3.1tu.int/av-arch/jctvc-site/, No. JCTVC-D368, Jan. 15, 2011 (Jan. 15, 2011), 5 pages,XP030008407, ISSN: 0000-0011.

International Preliminary Report on Patentability—PCT/US2011/063795, The International Bureau of WIPO—Geneva, Switzerland, dated Jun. 10, 2013.

International Search Report and Written Opinion—PCT/US2011/063795—ISA/EPO—dated Jun. 13, 2012.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Karczewicz M., et al., "Video coding technology proposal by Qualcomm", 1. JCT-VC Meeting; Apr. 15, 2010-Apr. 23, 2010; Dresden; (Joint Collaborative Team on Video Coding of ISO/IEC JTC1/SC29/WG11 and ITU-TSG.16); URL: http://wftp3.itu.int/av-arch/jctvc-site/, No. XP030007566, May 18, 2010 (May 18, 2010), pp. 1-24, XP030007567, ISSN: 0000-0049 p. 1 p. 12-p. 13.

Karczewicz, M., et al., "Video Coding Technology Proposal by Qualcomm Inc.", Joint Collaborative Team on Video Coding (JCT-VC) of ITU-T SG16 WP3 and ISO/IEC JTC1/SC29/WG11, Document: JCTVC-A121, Status: Input Document to JCT-VC, Apr. 2010, pp. 1-24.

McCann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Muhit, et al., "A Fast Approach for Geometry-Adaptive Block Partitioning," Proc. of the 27th Conf on Picture Coding Symposium, May 6-8, 2009, Chicago, IL, 4 pp.

Nogaki S., et al., "An Overlapped block Motion Compensation for High Quality Motion Picture Coding", Proceedings of the International Symposium on Circuits and Systems, San Diego, May 10-13, 1992; [Proceedings of the International Symposium on Circuits and Systems, (ISCAS)], New York, IEEE, US, vol. 1, May 3, 1992 (May 3, 1992), pp. 184-187, XP010061071.

Orchard M.T., et al., "Overlapped Block Motion Compensation: An Estimation-Theoretic Approach", IEEE Transactions on Image Processing, IEEE Service Center, Piscataway, NJ, US, vol. 3, No. 5, Sep. 1, 1994, pp. 693-699, XP000476843, ISSN: 1057-7149, DOI: 10.1109/83.334974.

Second Written Opinion from International application No. PCT/US2011/063795, dated Feb. 18, 2013, 7 pp.

Sullivan, G.J., et al., "Overview of the High Efficiency Video Coding (HEVC) Standard", IEEE Transactions on Circuits and Systems for Video Technology, IEEE Service Center, Piscataway, NJ, US, vol. 22 (12), Dec. 1, 2012 (Dec. 1, 2012), pp. 1649-1668, XP011486324, ISSN: 1051-8215, DOI: 10.1109/TCSVT.2012.2221191.

Tech G., et al., "3D-HEVC Draft Text 6," Joint Collaborative Team on 3D Video Coding Extensions of ITU-T SG 16 WP 3 and ISO/IEC JTC 1/SC 29/WG 11, 10th Meeting: Strasbourg, FR, Oct. 18-24, 2014, document No. JCT3V-J1001-v6, 99 Pages.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 160 pages.

Wiegand, T., et al., "WD3: Working Draft 3 of High-Efficiency Video Coding", Joint Collaborative Team on Video Coding (JCT-VC) of ITU-T SG16 WP3 and ISO/IEC JTC1/SC29/WG11, Document JCTVC-E603_d1, 5th Meeting: Geneva, CH, Mar. 16-23, 2011, 167 Pages.

Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Winken M., et al., "Description of Video coding technology proposal by Fraunhofer HHI," JCTVC-A116 Meeting; Apr. 15, 2010-Apr. 23, 2010; Dresden; (Joint Collaborative Team on Video Coding of ISO/IEC JTC1/SC29/WG11 and ITU-TSG. 16) ; URL: http://wftp3. itu. int/av-arch/jctvc-site/, No. Apr. 24, 2010 (Apr. 24, 2010), 44 pages, XP030007557.

Ye Y., et al., "Improved H.264 Intra Coding Based on Bi-Directional Intra Prediction, Directional Transform, and Adaptive Coefficient Scanning", 15th IEEE International Conference on Image Processing, 2008. ICIP 2008, Oct. 2008, pp. 2116-2119.

Zheng Y., et al., "Simplified intra smoothing", 94. MPEG Meeting; Oct. 11, 2010-Oct. 15, 2010; Guangzhou; (Motion Picture Expert Group or ISO/IEC JTC1/SC29/WG11), No. M18274, Oct. 28, 2010 (Oct. 28, 2010), XP030046864.

\* cited by examiner

IDENTIFICATION OF SAMPLES IN A TRANSITION ZONE

CROSS-REFERENCE TO RELATED APPLICATIONS

This application is a continuation of U.S. patent application Ser. No. 13/311,834, filed Dec. 6, 2011, which claims the benefit of U.S. Provisional Application No. 61/431,408, filed Jan. 10, 2011, U.S. Provisional Application No. 61/450,532, filed Mar. 8, 2011, U.S. Provisional Application No. 61/450,538, filed Mar. 8, 2011, and U.S. Provisional Application No. 61/537,450, filed Sep. 21, 2011, the entire content of each being hereby incorporated by reference.

TECHNICAL FIELD

This disclosure relates to video coding.

BACKGROUND

Digital video capabilities may be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block may be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

Generally, the techniques described in this disclosure may increase the coding efficiency for a coding unit (CU) by adaptively selecting a neighbor region size. As described in this disclosure, a CU may have multiple prediction units (PUs). A computing device may perform a motion compensation operation to generate a prediction block for the CU. The prediction block may be a two-dimensional block of samples. Each of the samples may indicate a pixel value. When the computing device performs the motion compensation operation, the computing device may use motion information of the PUs.

In some circumstances, coding efficiency may be enhanced by performing a smoothing operation on samples in a transition zone of the prediction block. The transition zone is located at a boundary between samples of the prediction block associated with different ones of the PUs. Samples of the prediction block may be in the transition zone if neighbor regions that contain the samples also contain samples of the prediction block that are associated with a different one of the PUs. Different coding efficiencies for data associated with the CU may be achieved depending on the sizes of the neighbor regions. According to techniques of this disclosure, the sizes of the neighbor regions may be selected by a computing device in order to enhance coding efficiency for data associated with the CU.

In one example, this disclosure describes a method of coding video data. The method comprises performing a motion compensation operation to generate a prediction block for a CU in a frame of the video data. The CU has a first PU and a second PU. The method also comprises selecting, by a computing device, a first neighbor region size. In addition, the method comprises after selecting the first neighbor region size, identifying samples in a first transition zone of the prediction block. The first transition zone includes a sample associated with the first PU when a neighbor region contains the sample and also contains a sample of the prediction block that is associated with the second PU. The neighbor region has the first neighbor region size. The method also comprises performing a first smoothing operation on the samples in the first transition zone.

In another example, this disclosure describes a computing device that codes video data. The computing device comprises a processor configured to perform a motion compensation operation to generate a prediction block for a CU in a frame of video data. The CU has a first PU and a second PU. In addition, the processor is configured to select a first neighbor region size. The processor is also configured such that after selecting the first neighbor region size, the processor identifies samples in a first transition zone of the prediction block. The first transition zone includes a sample associated with the first PU when a neighbor region contains the sample and also contains a sample of the prediction block that is associated with the second PU. The neighbor region has the first neighbor region size. In addition, the processor is configured to perform a first smoothing operation on the samples in the first transition zone.

In another example, this disclosure describes a computing device that codes video data. The computing device comprises means for performing a motion compensation operation to generate a prediction block for a CU in a frame of the video data. The CU has a first PU and a second PU. The computing device also comprises means for selecting a neighbor region size. In addition, the computing device comprises means for identifying, after selecting the neighbor region size, samples in a transition zone of the prediction block. The transition zone includes a sample associated with the first PU when a neighbor region contains the sample and also contains a sample of the prediction block that is associated with the second PU. The neighbor region has the neighbor region size. In addition, the computing device comprises means for performing a smoothing operation on the samples in the transition zone.

In another example, this disclosure describes a computer program product for coding video data. The computer program product comprises a computer-readable storage medium having instructions stored thereon that cause one or more processors to perform a motion compensation operation to generate a prediction block for a CU in a frame of the video data. The CU has a first prediction unit (PU) and a second PU. The instructions also cause the processors to select a neighbor region size. In addition, after selecting the neighbor region size, the instructions cause the processors to identify samples in a transition zone of the prediction block. The transition zone includes a sample associated with the first PU when a neighbor region contains the sample and also contains a sample of the prediction block that is associated with the second PU. The neighbor region has the neighbor region size. The instructions also cause the processors to perform a smoothing operation on the samples in the transition zone.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
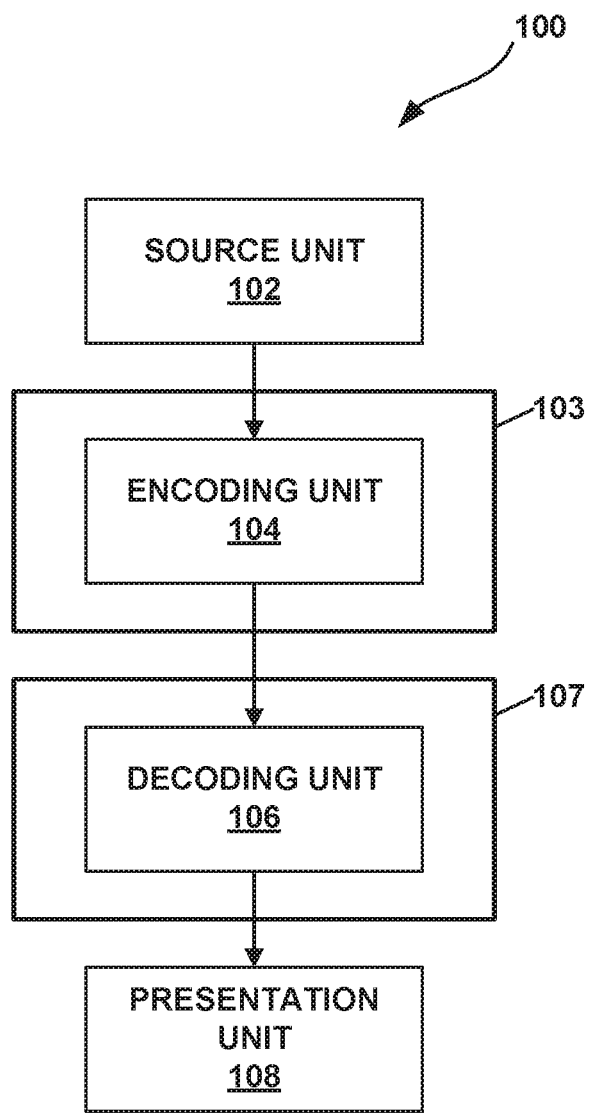
FIG. 1 is a block diagram that illustrates an example multimedia coding system.

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words may merely be used to refer to different elements of the same or similar kind.

A frame of video data is associated with one or more blocks of samples (i.e., a sample block). A sample may be a value defining a component of a pixel, such as a luma or a chroma component of the pixel. A sample block may refer to a two-dimensional array of such samples. Each of the sample blocks of the frame may specify different components of the pixels in the frame. An encoder may first partition a frame into "slices." A slice is a term used generally to refer to independently decodable portions of the frame.

The encoder may next partition these slices into "treeblocks." A treeblock may also be referred to as a largest coding unit (LCU). The encoder may partition the treeblocks into a hierarchy of progressively smaller sample blocks, which when illustrated may be represented as a hierarchical tree structure, hence the name "treeblocks." The leaf nodes of such a hierarchical tree structure may correspond to coding units (CUs) in that these leaf nodes define a sample block or unit that is to be coded. In this way, each of the CUs is associated with a different sample block of the frame. Partitioning treeblocks in this way may enable the encoder to capture motion of different sizes.

Each of the CUs may have one or more prediction units (PUs). The sample block of a CU is partitioned into prediction areas associated with the PUs of the CU. A coder may perform a motion estimation operation with respect to the prediction areas of the sample block to generate motion information for each prediction area. The motion information for each of the prediction areas is stored as the PU. An encoder or decoder uses the motion information determined for the PUs to generate a prediction block for the CU. In this disclosure, the term "coder" may refer to either an encoder or a decoder and the term "coding" may refer to either encoding or decoding.

In some instances, the coder performs a smoothing operation to smooth samples in a transition zone of the prediction block. The transition zone occurs generally at a boundary between samples of prediction block that are associated with different PUs. The coder may perform this smoothing operation to improve subsequent coding of residual data of the CU and/or resulting video quality of the video data when reconstructed by a decoder (where such video data may be referred to as "reconstructed video data").

While in some instances smoothing the samples in the transition zone improves the compression performance and/or visual quality of the reconstructed video data, in other instances performing of the smoothing operation introduces artificial effects that degrade compression performance. Thus, performing the smoothing operation may result in compressed video data that is larger in size due to the introduction of additional residual data by the smoothing operation. Moreover, these introduced artificial effects may degrade the subjective perception of the reconstructed video data when viewed by a viewer, which impacts subjective video quality. In some other instances, performing this smoothing operation may remove data in the video content that may be considered important to a particular frame, which may further reduce visual quality and impact reconstruction of other frames that rely on this frame for reconstruction of the frame. The loss of data through performance of this smoothing operation may, furthermore, be irreversible, meaning that the decoder may not be able to recover the lost data.

This disclosure provides techniques for adaptively performing a smoothing operation in a manner that potentially improves visual quality and compression performance. Rather than perform a smoothing operation to smooth samples in transition zones of each and every prediction block, as is common in conventional encoders, the techniques enable a coder to adaptively perform the smoothing operation in instances where the coder determines that it would be most beneficial, as measured in terms of visual quality or compression performance. For instance, the coder may adaptively perform the smoothing operation based on a size of one or more PUs of a CU.

With a large transition zone, more samples may be manipulated. However, processing too many samples may introduce extra distortion. With a small transition zone, the performance of the smoothing operation may be limited. In accordance with some techniques described in this disclosure, the coder adaptively selects a neighbor region size. The coder uses regions of the selected neighbor region size to determine whether samples of the prediction block are within the transition zone. In this way, the coder may select the size of the transition zone to maximize the performance of the smoothing operation.

FIG. 1 is a block diagram that illustrates an example multimedia coding system 100. Multimedia coding system 100 captures video data, encodes the captured video data, transmits the encoded video data, decodes the encoded video data, and then plays back the decoded video data.

Multimedia coding system 100 comprises a source unit 102, an encoding unit 104, a decoding unit 106, and a presentation unit 108. Source unit 102 generates video data. Encoding unit 104 encodes the video data. Decoding unit 106 decodes the encoded video data. Presentation unit 108 presents the decoded video data.

One or more computing devices implement source unit 102, encoding unit 104, decoding unit 106, and presentation unit 108. In this disclosure, the term computing device encompasses physical devices that process information. Example types of computing devices include personal computers, laptop computers, mobile telephones, smartphones, tablet computers, in-car computers, television set-top boxes, video conferencing systems, video production equipment, video cameras, video game consoles, or others types of devices that process information.

In some examples, a single computing device may implement two or more of source unit 102, encoding unit 104, decoding unit 106, and presentation unit 108. For example, a single computing device may implement source unit 102 and encoding unit 104. In this example, another computing device may implement decoding unit 106 and presentation unit 108. In other examples, different computing devices implement source unit 102, encoding unit 104, decoding unit 106, and presentation unit 108.

In the example of FIG. 1, a computing device 103 implements encoding unit 104 and a computing device 107 implements decoding unit 106. In some examples, computing device 103 may provide functionality in addition to encoding unit 104. Furthermore, in some examples, computing device 107 may provide functionality in addition to decoding unit 106.

As mentioned briefly above, source unit 102 generates video data that represent a series of frames. A frame is also commonly referred to as a "picture." When the series of frames in the video data are presented to a user in rapid succession (e.g., 24 or 25 frames per second), the user may perceive objects in the frames to be in motion.

Figure 2:
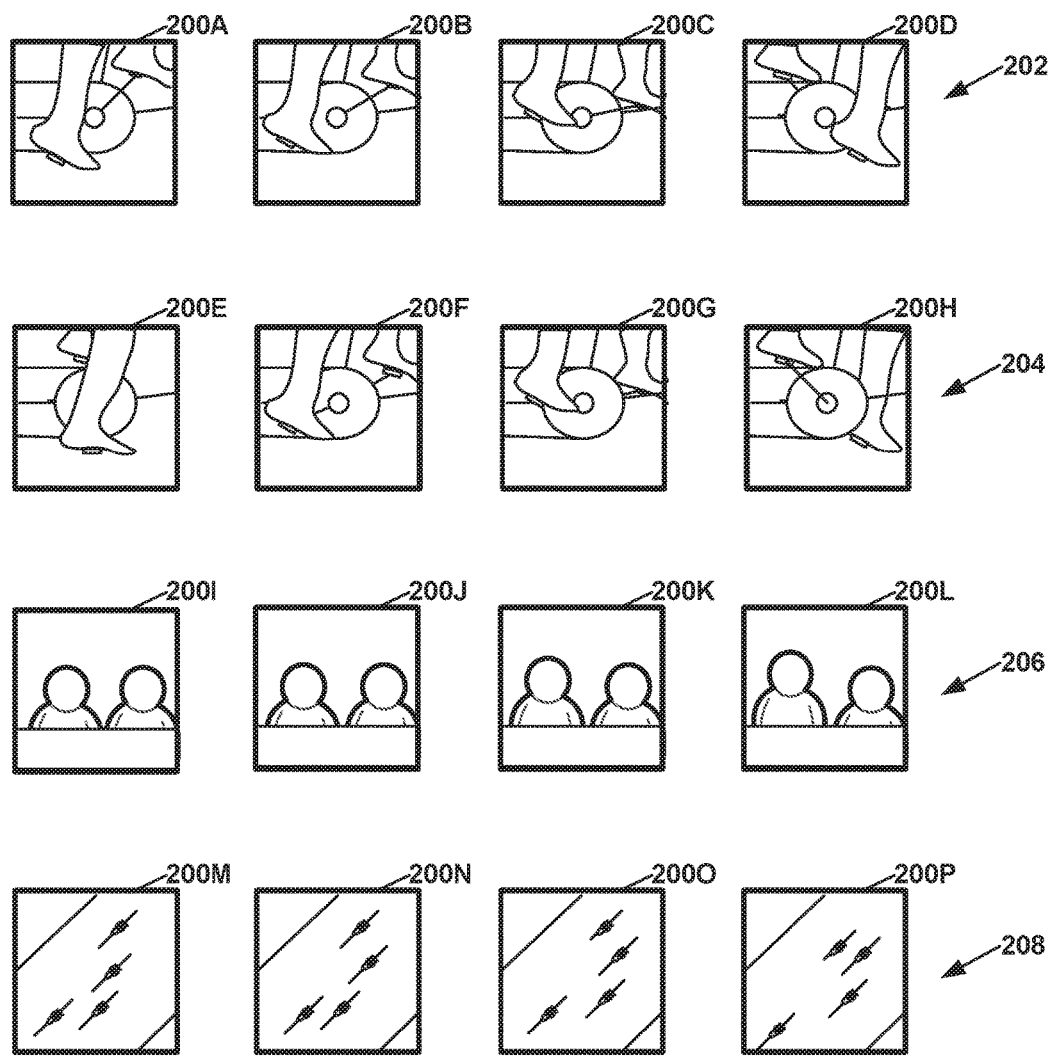
FIG. 2 is a conceptual diagram that illustrates an example series of frames in a video.

FIG. 2 is a conceptual diagram that illustrates an example series of frames 200A through 200P in video data. This disclosure refers collectively to frames 200A through 200P as "frames 200." The video data represents scenes of a bicycle race. The frames in rows 202 and 204 show a scene of a person pedaling a bicycle. The frames in row 206 show two commentators sitting behind a desk. The frames in row 208 show a scene of bicycle racers from overhead. Each frame within a scene may differ slightly from the preceding frame. By presenting frames 200 in rapid succession, users may perceive the motion in these scenes.

Continuing reference is now made to the example of FIG. 1. In various examples, source unit 102 generates the video data in various ways. For example, source unit 102 may comprise a video camera. In this example, the video camera captures images from a visible environment. In another example, source unit 102 may comprise one or more sensors for medical, industrial, or scientific imaging. Such sensors may include x-ray detectors, magnetic resonance imaging sensors, particle detectors, and so on. In yet another example, source unit 102 may comprise an animation system. In this example, one or more users may use the animation system to draw, draft, program, or otherwise design the content of the video data from their imaginations.

Encoding unit 104 receives the video data generated by source unit 102. Encoding unit 104 encodes the video data such that less data represents the series of frames in the video data. In some instances, encoding the video data in this way may be necessary to ensure that the video data may be stored on a given type of computer-readable media, such as a DVD or CD-ROM. Furthermore, in some instances, encoding the video data in this way may be necessary to ensure that the video data may be efficiently transmitted over a communication network, such as the Internet.

Encoding unit 104 may encode video data, which is often expressed as a sequence or series of video frames. To encode the video data, encoding unit 104 may split these frames into independently decodable portions (which are commonly referred to as "slices"), which in turn, encoding unit 104 may split into treeblocks. These treeblocks may undergo a form of recursive hierarchical quadtree splitting. Encoding unit 104 may perform this splitting to generate a hierarchical tree-like data structure, with the root node being referred to as a "treeblock." The leaf nodes of this hierarchical tree-like data structure may be referred to as "coding nodes." A "coding unit" or "CU" includes the coding node as well as other types of information, including motion information and transform information. Each coding node identifies a sample block within a treeblock. In this disclosure, the sample block identified by a coding node associated with a CU may be referred to as the sample block of the CU.

Encoding unit 104 may use rectangular and/or geometric partitioning modes to partition the sample block of a CU into prediction areas. When encoding unit 104 uses a geometric partitioning mode to partition the sample block of a CU, a boundary between the partition areas might not meet the edges of the sample block at right angles. Encoding unit 104 may perform a form of motion estimation with respect to each prediction area to generate motion information, such as a motion vector, for each prediction area. A "prediction unit" or "PU" of a CU may contain information indicating a prediction area of the CU, the motion information for the prediction area, and/or other information regarding the prediction area. Encoding unit 104 may use the motion information to generate a prediction block.

In accordance with the techniques of this disclosure, encoding unit 104 may make a determination based on a size of a first PU of the CU whether to perform a smoothing operation. The transition zone occurs at a boundary between samples of the prediction block associated with the first PU of the CU and samples of the prediction block associated with a second PU of the CU. After encoding unit 104 makes the determination to perform the smoothing operation, encoding unit 104 may perform the smoothing operation to smooth the samples in the transition zone of the prediction block.

Furthermore, in accordance with the techniques of this disclosure, encoding unit 104 may determine whether samples of the prediction block are in the transition zone by selecting a neighbor region size. After selecting the neighbor region size, encoding unit 104 may identify samples in the transition zone of the prediction block. The transition zone includes a sample associated with a first PU of the CU when a neighbor region contains the sample and also contains a sample of the prediction block that is associated with a second PU of the CU. The neighbor region has the selected neighbor region size.

Encoding unit 104 then determines residual data by comparing the original sample block of the CU to the prediction block. After determining this residual data, encoding unit 104 may apply a transform to residual data. Thus, encoding unit 104 applies the smoothing operation to the samples in the transition zone of the prediction block before applying the transform to the residual data derived from the prediction block. To transform this residual data, encoding unit 104 may partition the residual data into one or more transform areas. Encoding unit 104 then applies one or more transforms to the transform areas of the residual data to generate transformed residual data, which may also be referred to as a "transform coefficient block." This transform coefficient block typically expresses the residual data as a block of transform coefficients. The transformed residual data is then stored to a transform unit (TU) of the corresponding CU. Thus, a CU comprises a coding node or sample block, a TU and a CU, as well as, any other syntax elements that may be necessary to decode the transformed residual data.

Decoding unit 106 receives encoded video data. In various examples, decoding unit 106 may receive the encoded video data in various ways. For example, decoding unit 106 may receive a computer-readable medium, such as a DVD, that stores the video data. In another example, decoding unit 106 may receive the encoded video data from a communication medium, such as the Internet, a local area network (LAN), a cable connected to another computing device, or a wireless networking link.

After receiving the encoded video data, decoding unit 106 decodes the encoded video data. When decoding unit 106 decodes the encoded video data, decoding unit 106 may generate a prediction block for a CU of a frame in the video data. Decoding unit 106 may then determine whether to perform a smoothing operation on samples in the transition zone of the prediction block. The transition zone of the predicted block may be at a boundary between samples of the prediction block associated with a first PU of the CU and samples of the prediction block associated with a second PU of the CU. After decoding unit 106 makes the determination to perform the smoothing operation on the samples in the transition zone, decoding unit 106 performs the smoothing operation to smooth the samples in the transition zone of the prediction block.

Furthermore, in accordance with the techniques of this disclosure, decoding unit 106 may determine whether samples of the prediction block are in the transition zone by selecting a neighbor region size. After selecting the neighbor region size, decoding unit 106 may identify samples in the transition zone of the prediction block. The transition zone includes a sample associated with a first PU of the CU when a neighbor region contains the sample and also contains a sample of the prediction block that is associated with a second PU of the CU. The neighbor region has the selected neighbor region size.

Presentation unit 108 receives the decoded video data from decoding unit 106. In various examples, presentation unit 108 receives the decoded video data in various ways. For example, where a single computing device provides decoding unit 106 and the presentation system 108, presentation unit 108 may receive the decoded video data via one or more internal communication media, such as cables or buses. In another example, presentation unit 108 may receive the decoded video data from one or more computer-readable media, such as a network connection, DVD, CD-ROM, solid-state memory device, and so on. After receiving the decoded video data, presentation unit 108 presents the frames in the decoded video data to one or more users.

Figure 3:
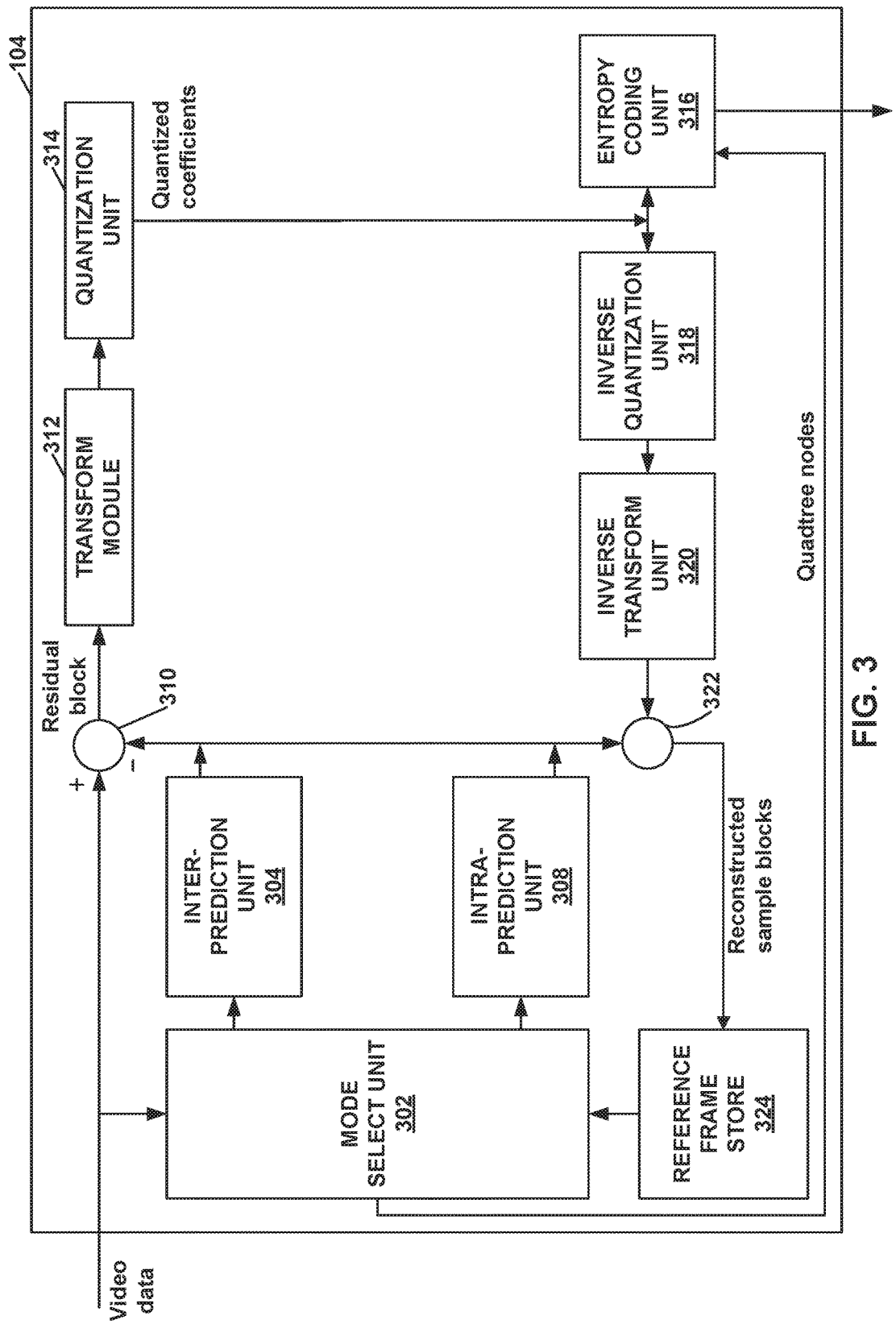
FIG. 3 is a block diagram that illustrates an example configuration of an encoding unit.

FIG. 3 is a block diagram that illustrates an example configuration of encoding unit 104. In the example of FIG. 3, encoding unit 104 provides a mode select unit 302, an inter-prediction unit 304, an intra-prediction unit 308, a residual generation unit 310, a transform module 312, a quantization unit 314, an entropy coding unit 316, an inverse quantization unit 318, an inverse transform unit 320, a reconstruction unit 322, and a reference frame store 324. Readers will understand that some examples of encoding unit 104 may comprise more, fewer, or different units.

In various examples, encoding unit 104 implements mode select unit 302, inter-prediction unit 304, intra-prediction unit 308, residual generation unit 310, transform module 312, quantization unit 314, entropy coding unit 316, inverse quantization unit 318, inverse transform unit 320, reconstruction unit 322, and reference frame store 324 in various ways. For example, the one or more computing devices that implement encoding unit 104 may implement one or more of these units when processors of the one or more computing devices execute certain computer-readable instructions stored on one or more computer-readable media. In this example, these units or modules may or may not be implemented as discrete, modular pieces of computer software. In another example, the one or more computing devices that implement encoding unit 104 may comprise one or more application-specific integrated circuits (ASICs) that implement the functionality of one or more of these units. In some examples, the functionality of these units may be provided by separate computing devices.

Encoding unit 104 receives data representing frames of video data. When encoding unit 104 receives data representing a frame, encoding unit 104 encodes the frame. For ease of explanation, this disclosure refers to the frame being encoded as the source frame. The data representing the source frame comprises one or more blocks of samples.

To encode the source frame, mode select unit 302 partitions a sample block of the frame among a plurality of treeblocks. In some instances, a treeblock may be an N×N block of luma samples and two corresponding blocks of chroma samples. In some examples, a block is two-dimensional array of samples or transform coefficients. In other instances, a treeblock may be block of luma samples or a chroma sample array.

Mode select unit 302 may generate a quadtree for each of the treeblocks. The quadtree for a treeblock comprises a hierarchy of nodes. Initially, the quadtree of the given treeblock only comprises a root node. The root node corresponds to the given treeblock. Mode select unit 302 may partition the given treeblock into multiple smaller sample blocks. When mode select unit 302 partitions the given treeblock into multiple smaller sample blocks, mode select unit 302 adds child nodes to the quadtree of the given treeblock. Each of the child nodes corresponds to a different one of the smaller sample blocks. In some examples, mode select unit 302 may subdivide one or more of the smaller sample blocks into yet smaller sample blocks. When mode select unit 302 partitions a smaller sample blocks into yet smaller sample blocks, mode select unit 302 may add grandchild nodes to the quadtree of the given treeblock. Each of the grandchild nodes corresponds to one of the yet smaller sample blocks. The grandchild nodes are children of the child nodes. Mode select unit 302 may continue partitioning the given treeblock and generating nodes in the quadtree of the given treeblock as appropriate, up to a pre-configured limit. Nodes in the quadtree that have no child nodes (i.e., leaf nodes) are referred herein as coding nodes.

Each of the coding nodes corresponds to a different CU. A coding node of a CU is a root node of a prediction tree and a transform tree. The prediction tree stores information of PUs of the CU. For example, the prediction tree may specify sizes and positions of prediction areas of the PUs. The PUs of the CU may also comprise additional associated prediction data. The transform tree stores information regarding TUs of the CU. For example, the transform tree may specify sizes and positions of transform area of the TUs. The TUs of the CU may also comprise additional associated transform data.

Figure 4:
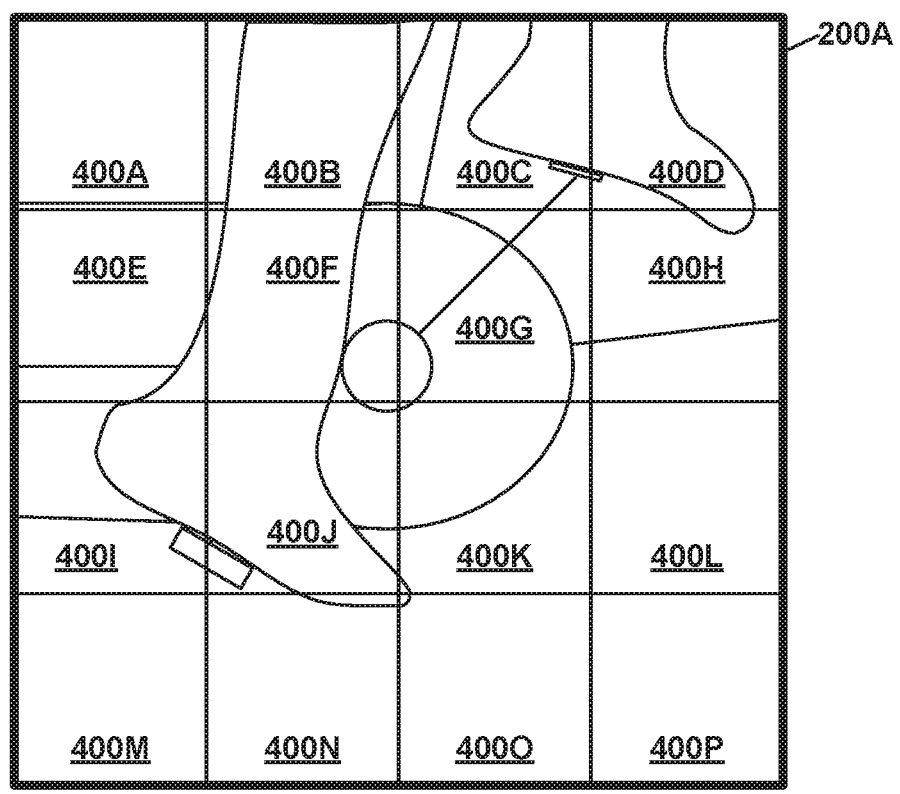
FIG. 4 is a conceptual diagram that illustrates an example frame partitioned into treeblocks.

FIG. 4 is a conceptual diagram that illustrates example frame 200A partitioned into treeblocks 400A through 400P (collectively, "treeblocks 400"). Each of treeblocks 400 is square and has the same size. For example, the sample blocks of treeblocks 400 may be 32 samples wide by 32 samples high (i.e., 32×32). In another example, the sample blocks of treeblocks 400 may be 64 samples wide by 64 samples high (i.e., 64×64).

Figure 5:
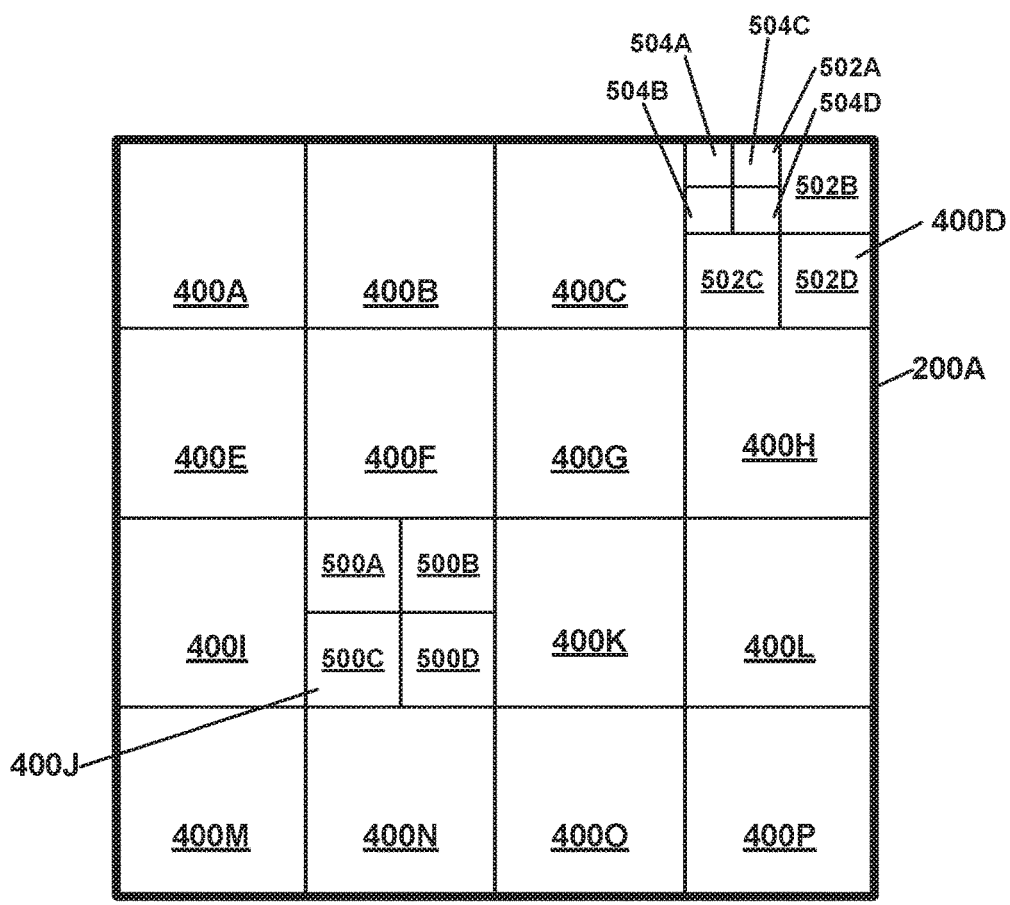
FIG. 5 is a conceptual diagram that illustrates a further example partitioning of treeblocks.

FIG. 5 is a conceptual diagram that illustrates a further example partitioning of treeblocks 400. In the example of FIG. 5, mode select unit 302 has partitioned the sample block of treeblock 400J into four smaller sample blocks 500A through 500D. Furthermore, in the example of FIG. 5, mode select unit 302 has partitioned sample block 400D into four sample blocks 502A through 504D. Mode select unit 302 has further subdivided sample block 502A into four more sample blocks 504A through 504D.

Continuing reference is now made to the example of FIG. 3. After mode select unit 302 generates a quadtree for a treeblock, inter-prediction unit 304 performs an inter-frame coding operation for each CU of the treeblock. When inter-prediction unit 304 performs the inter-frame coding operation for a CU, inter-prediction unit 304 uses rectangular and/or geometric partitioning modes to partition the sample block of the CU into prediction areas. The PUs of the CU specify these prediction areas.

After inter-prediction unit 304 uses a given partitioning mode to partition the sample block into two or more prediction areas, inter-prediction unit 304 may perform a motion estimation operation that generates motion information for the PUs associated with these prediction areas. During the motion estimation operation, inter-prediction unit 304 searches a reference frame for reference samples for the PUs. A reference sample for a PU is a portion of a reference frame that corresponds to the samples in the prediction area of the PU. Inter-prediction unit 304 generates motion information for a PU to indicate the reference sample for the PU.

Inter-prediction unit 304 uses the reference samples for the PUs of a CU to generate a prediction block for the CU. The prediction block of a CU is a block of predicted samples. The prediction block for a CU may differ somewhat from the sample block of the CU. For example, samples in the prediction block may have slightly different colors or brightnesses from the corresponding samples of the sample block of the CU.

In accordance with the techniques of this disclosure, inter-prediction unit 304 may make a determination whether to perform a smoothing operation on samples in a transition zone of the prediction block. If inter-prediction unit 304 makes the determination to perform the smoothing operation on the samples in the transition zone, inter-prediction unit 304 perform the smoothing operation to smooth the samples in the transition zone. Furthermore, inter-prediction unit 304 may adaptively identify samples in the transition zone of the prediction block. For example, inter-prediction unit 304 may select a neighbor region size. After selecting the neighbor region size, inter-prediction unit 304 may identify samples in the transition zone. In this example, the transition zone includes a sample associated with a first PU of the CU when a neighbor region contains the sample and also contains a sample of the prediction block that is associated with a second PU of the CU. The neighbor region has the selected neighbor region size.

Intra-prediction unit 308 may use samples in the sample blocks of other CUs of the source frame to generate a prediction block for the CU. In various examples, intra-prediction unit 308 generates the prediction block in various ways. For example, intra-prediction unit 308 may generate the prediction block of the CU such that samples in neighboring CUs extend horizontally across or vertically down through the prediction block. Intra-prediction unit 308 may also select an intra-prediction mode that best corresponds to the sample block of the CU.

After inter-prediction unit 306 and intra-prediction unit 308 generate prediction blocks for the CU, mode select unit 302 may select one of the prediction blocks for the CU. If the mode select unit 302 selects a prediction block generated by intra-prediction unit 308, mode select unit 302 may add a syntax element to the coding node of the CU to indicate the intra-prediction mode that intra-prediction unit 308 used when generating the selected prediction block. If mode select unit 302 selects a prediction block generated by inter-prediction unit 304, mode select unit 302 may add a syntax element to the coding node for the CU that indicates that inter-prediction was used to encode the CU. In addition, mode select unit 302 may add syntax elements to the prediction tree of the CU. For example, mode select unit 302 may add syntax elements to the prediction tree indicating the sizes and locations of PUs of the CU, motion vectors for the PUs, and other data generated during the inter-frame coding operation. Furthermore, mode select unit 302 may add syntax elements to the transform tree of the CU. For example, mode select unit 302 may add syntax elements to the transform tree indicating the sizes and locations of TUs of the CU.

In some examples, a syntax element is an element of data represented in a bitstream. A bitstream may be a sequence of bits that forms a representation of coded pictures and associated data forming one or more coded video sequences. A coded video sequence may be a sequence of access units. An access unit may be a set of Network Abstraction Layer (NAL) units that are consecutive in decoding order and contain exactly one primary coded picture. A NAL unit may be a syntax structure containing an indication of the type of data to follow and bytes containing that data in the form of a raw byte sequence payload interspersed as necessary with emulation prevention bits. A primary coded picture may be a coded representation of a picture to be used by a decoding process for a bitstream.

After mode select unit 302 selects a prediction block of the CU, residual generation unit 310 may use the original sample block of the CU and the selected prediction block of the CU to generate residual data for the CU. In some examples, the residual data for the CU may be arranged as a two-dimensional array of the residual data (i.e., a residual block). The residual data for the CU may represent the differences between the original sample block of the CU and the prediction block of the CU. In various examples, residual generation unit 310 may generate the residual data in various ways. For example, residual generation unit 310 may generate the residual data for the CU by subtracting the samples in the prediction block of the CU from the samples in the sample block of the CU.

As mentioned briefly above, each CU has one or more TUs. A transform unit may comprise a transform tree and associated transform data. The transform tree may specify the sizes and positions of transform areas. For example, the transform tree may indicate the location of an upper left corner of a transform area. In this example, the size of the transform area may be derived from a depth of a corresponding node in the transform tree.

When residual generation unit 310 generates residual data for the CU, transform module 312 may perform a transform operation for each TU of the CU. When transform module 312 performs the transform operation for a TU of the CU, transform module 312 transforms applicable samples of the residual data from a spatial domain to a frequency domain. Transform module 312 may store samples in the frequency domain as a transform coefficient block. The applicable samples of the residual data may include samples of the residual data in the transform area specified by the TU. The transform coefficient block is a two-dimensional array of transform coefficients. In some examples, a transform coefficient may be a scalar quantity, considered to be in a frequency domain, that is associated with a particular one-dimensional or two-dimensional frequency index in an inverse transform part of a decoding process.

When transform module 312 performs the transform operation on samples of the residual data, transform module 312 applies a mathematical transformation to the samples. For example, transform module 312 may perform a Discrete Cosine Transform (DCT) on the samples to transform the samples from the spatial domain to the frequency domain.

Transform module 312 may provide the resulting transform coefficient block to quantization unit 314. Quantization unit 314 may perform a quantization operation on the transform coefficient block. When quantization unit 314 performs the quantization operation, quantization unit 314 may quantize each of the transform coefficients in the transform coefficient block, thereby generating a quantized transform coefficient block. The quantized transform coefficient block is a two-dimensional array of quantized transform coefficients. In various examples, quantization unit 314 performs various quantization operations. For example, quantization unit 314 may perform a quantization operation that quantizes the transform coefficients by dividing the transform coefficients by a quantization parameter and then clipping the resulting quotients.

After quantization unit 314 performs the quantization operation on the transform coefficient blocks of the CU, entropy coding unit 316 performs an entropy coding operation on the quantized transform coefficient block of the CU, the coding node of the CU, the prediction tree of the CU, and the transform tree of the CU. Entropy coding unit 316 generates entropy coded data for the CU as a result of performing this entropy coding operation. In some instances, when entropy coding unit 316 performs the entropy coding operation, quantization unit 314 may reduce the number of bits needed to represent the data of the CU. In various instances, entropy coding unit 316 may perform various entropy coding operations on the data of the CU. For example, entropy coding unit 316 may perform a context-adaptive variable-length coding (CAVLC) operation or a context-adaptive binary arithmetic coding (CABAC) operation on the data of the CU.

Encoding unit 104 generates a bitstream that includes entropy encoded data for the CU. In various examples, encoding unit 104 may generate various types of bitstreams that include the entropy encoded data for the CU. For example, encoding unit 104 may output a NAL unit stream. In this example, the NAL unit stream comprises a sequence of syntax structures called NAL units. The NAL units are ordered in decoding order. The one or more of the NAL units may include the entropy encoded data for the CU. In another example, encoding unit 104 may output a byte stream. Encoding unit 104 constructs the byte stream from a NAL unit stream by ordering NAL units in decoding order and prefixing each NAL unit with a start code prefix and zero or more zero-value bytes to form a stream of bytes.

Inverse quantization unit 318 performs an inverse quantization operation on quantized transform coefficient blocks. The inverse quantization operation at least partially reverses the effect of the quantization operation performed by quantization unit 314, thereby generating transform coefficient blocks.

Inverse transform unit 320 performs an inverse transform operation on transform coefficient blocks generated by inverse quantization unit 318. When inverse transform unit 320 performs the inverse transform operation, inverse transform unit 320 reverses the effect of the transformation operation performed by transform module 312, thereby generating reconstructed residual data.

Reconstruction unit 322 performs a reconstruction operation that generates reconstructed sample blocks. Reconstruction unit 322 generates the reconstructed sample blocks based on the reconstructed residual data and the prediction blocks generated by inter-prediction unit 304 or intra-prediction unit 308. In various examples, reconstruction unit 322 performs various reconstruction operations. For example, reconstruction unit 322 performs the reconstruction operation by adding the samples in the reconstructed residual data with corresponding samples in the prediction blocks.

Reference frame store 324 stores the reconstructed sample blocks. After encoding unit 104 has encoded data for each CU of the source frame, encoding unit 104 has generated reconstructed sample blocks for each CU in the source frame. Hence, reference frame store 324 stores a complete reconstruction of the sample block of the source frame.

Mode select unit 302 may provide the reconstructions of the sample blocks of the source frame to inter-prediction unit 304 as a reference frame.

Figure 6:
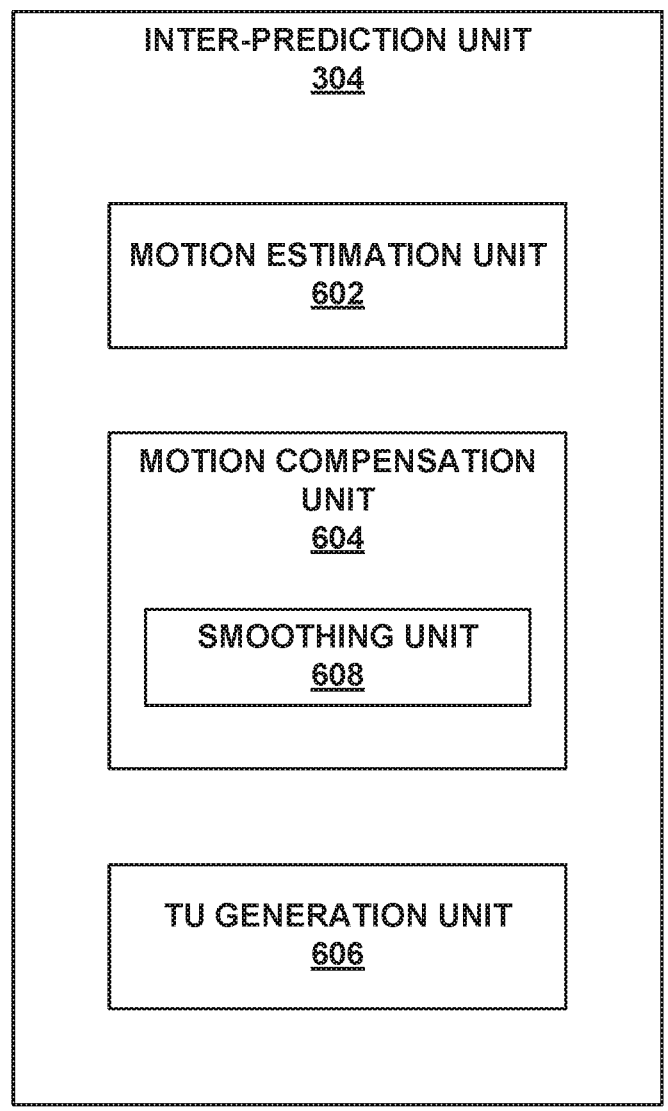
FIG. 6 is a block diagram that illustrates an example configuration of an inter-prediction unit.

FIG. 6 is a block diagram that illustrates an example configuration of inter-prediction unit 304. In the example of FIG. 6, inter-prediction unit 304 comprises a motion estimation unit 602, a motion compensation unit 604, and a TU generation unit 606. Motion compensation unit 604 comprises a smoothing unit 608. Readers will understand that other example configurations of inter-prediction unit 304 may include more, fewer, or different components.

Motion estimation unit 602 may perform a motion estimation operation for each PU of a CU. Motion compensation unit 604 may perform a motion compensation operation that generates a prediction block for the CU. TU generation unit 606 may perform a transform unit selection operation that generates TUs of the CU. In accordance with the techniques of this disclosure, smoothing unit 608 may adaptively perform a smoothing operation on samples in a transition zone of the prediction block. In addition, smoothing unit 608 may determine which samples of the prediction block are in the transition zone. Although FIGS. 12-21 are described as operations performed by smoothing unit 608, the operations described in FIGS. 12-21 may be performed by a motion compensation unit of decoding unit 106.

When motion estimation unit 602 performs the motion estimation operation for the CU, motion estimation unit 602 may generate one or more prediction trees. Each of the prediction trees may be associated with a different PU of the CU. Each of the prediction trees may specify a position and a size of a prediction area. For ease of explanation, this disclosure may refer to the position or size of the prediction area specified by the prediction tree of a PU as the position or size of the PU.

Motion estimation unit 602 may search one or more reference frames for reference samples. The reference samples of a PU may be areas of the reference frames that visually correspond to portions of the sample block of the CU that fall within the prediction area of the PU. If motion estimation unit 602 finds such a reference sample for one of the PUs, motion estimation unit 602 may generate a motion vector. The motion vector is a set of data that describes a difference between the spatial position of the reference sample for a PU and the spatial position of the PU. For example, the motion vector may indicate that the reference sample of a PU is five samples higher and three samples to the right of the PU. Furthermore, in some circumstances, motion estimation unit 602 may not be able to identify a reference sample for a PU. In such circumstances, motion estimation unit 602 may select a skip mode or a direct mode for the PU.

In some examples, rather than performing a search for a reference sample of a PU, motion estimation unit 602 may predict a motion vector for the PU. In performing this motion vector prediction, motion estimation unit 602 may select one of the motion vectors determined for spatially neighboring CUs in the source frame or a motion vector determined for a co-located CU in a reference frame. Motion estimation unit 602 may perform motion vector prediction rather than search for a reference sample in order to reduce complexity associated with determining a motion vector for each partition.

Motion compensation unit 604 uses the inter-coding modes of the PUs to generate the prediction block of the CU. If motion estimation unit 602 selected the skip mode for a PU, motion compensation unit 604 may generate the prediction block of the CU such that samples in the prediction block that are associated with the PU match collocated samples in the reference frame. If motion estimation unit 602 selected the direct mode for a PU, motion compensation unit 604 may generate the prediction block such that samples in the prediction block that are associated with the PU match collocated samples in the sample block of the CU. If motion estimation unit 602 generated a motion vector for a PU, motion compensation unit 604 may generate the prediction block such that samples in the prediction block that are associated with the PU correspond to samples in a portion of the reference frame indicated by the motion vector. If motion estimation unit 602 generated multiple motion vectors for a PU, motion compensation unit 604 may generate the prediction block such that samples in the prediction block that are associated with the PU correspond to samples in portions of multiple reference frames indicated by the motion vectors of the PU.

Figure 7:
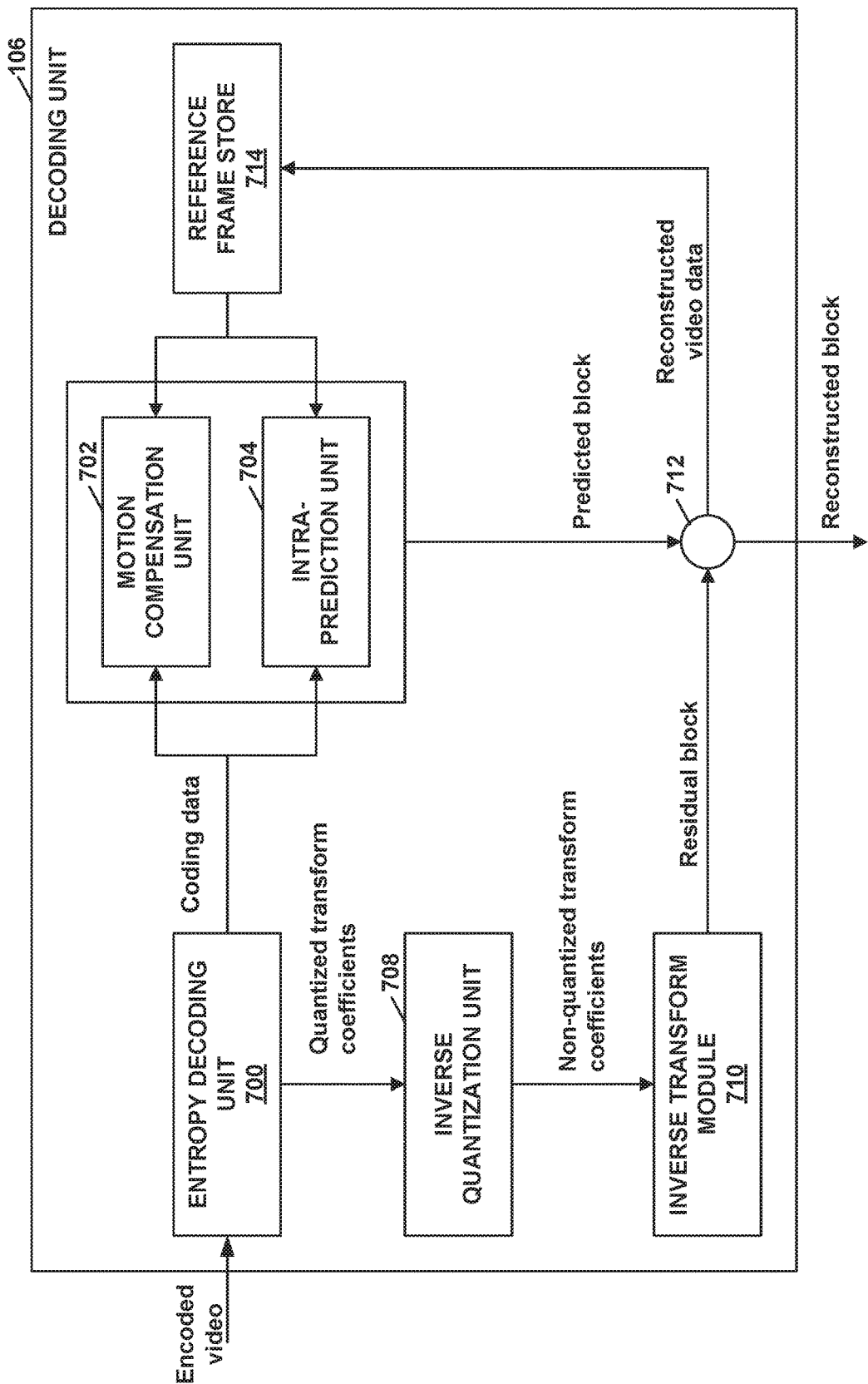
FIG. 7 is a block diagram that illustrates an example configuration of a decoding unit.

FIG. 7 is a block diagram that illustrates an example configuration of decoding unit 106. As illustrated in the example of FIG. 7, decoding unit 106 implements an entropy decoding unit 700, a motion compensation unit 702, an intra-prediction unit 704, an inverse quantization unit 708, an inverse transform module 710, a reconstruction unit 712, and a reference frame store 714. In various examples, decoding unit 106 implements these components in various ways. For example, the one or more computing devices that provide decoding unit 106 may implement these units when processors of the computing devices execute certain computer-readable instructions. In this example, these units or modules may or may not be implemented as discrete, modular pieces of computer software. In another example, the one or more computing devices that implement decoding unit 106 may comprise ASICs that provide the functionality of one or more of these units.

Decoding unit 106 receives an encoded bitstream that represents video data. The encoded bitstream may comprise data representing frames in the video data. For example, the encoded bitstream may comprise data representing each of frames 200 (FIG. 2). When decoding unit 106 receives data representing for a frame, decoding unit 106 decodes the data to reconstruct the frame. For ease of explanation, this disclosure may refer to this frame as the source frame.

When decoding unit 106 decodes the data for the source frame, decoding unit 106 receives encoded data for each CU of the source frame. For example, decoding unit 106 may receive an encoded version of a quantized transform coefficient block for the CU, an encoded version of the coding node of the CU, an encoded version of the prediction tree of the CU, and an encoded version of the transform tree of the CU. Decoding unit 106 then decodes the data of each CU of the source frame. When decoding unit 106 decodes the data of a given CU, entropy decoding unit 700 receives encoded data for the given CU. Entropy decoding unit 700 performs an entropy decoding operation on the encoded data for the given CU. The entropy decoding operation reverses the effects of the entropy coding operation performed by entropy coding unit 316 (FIG. 3).

Entropy decoding unit 700 provides the quantized transform coefficient block for the CU to inverse quantization unit 708. Entropy decoding unit 700 may provide coding data for the CU, such as the coding node, prediction tree, and transform tree of the CU, to motion compensation unit 702 and/or intra-prediction unit 704.

When motion compensation unit 702 receives the coding data for the CU, motion compensation unit 702 uses the coding data to perform a motion compensation operation that generates a prediction block for the CU. During the motion compensation operation, motion compensation unit 702 may retrieve one or more reference frames from reference frame store 714. The motion compensation unit 702 may then identify reference samples for PUs of the CU. The motion vectors for the PUs identify areas within the references frames as the reference samples for the PUs. After identifying the reference samples for PUs of the CU, motion compensation unit 702 generates a prediction block for the CU. In the prediction block, PUs of the CU may contain the reference samples of the PUs.

In accordance with the techniques of this disclosure, motion compensation unit 702 may perform an operation that adaptively performs a smoothing operation on samples in a transition zone of the prediction block. For example, motion compensation unit 702 may perform one of the example operations illustrated in FIGS. 12-18 and 20. Furthermore, in some instances, motion compensation unit 702 may determine which samples are within the transition zone. In some examples, motion compensation unit 702 may determine which samples are within the transition zone by performing the example operations illustrated in FIGS. 20 and 21.

When intra-prediction unit 704 receives the coding data for the CU, intra-prediction unit 704 uses the reconstructed sample blocks of previously decoded sample blocks in the source frame to generate the prediction block for the CU. Intra-prediction unit 704 may modify the samples in the prediction block according to an indicated intra-prediction mode.

Inverse quantization unit 708 receives one or more quantized transform coefficient blocks for each CU. When inverse quantization unit 708 receives quantized transform coefficient block for a CU, inverse quantization unit 708 performs an inverse quantization operation that at least partially reverses the effect of the quantization operation performed by quantization unit 314 (FIG. 3), thereby generating a non-quantized transform coefficient block for the CU.

Inverse transform module 710 performs an inverse transform operation on transform coefficient blocks. The inverse transform operation may reverse the effect of the transformation operation performed by transform module 312 (FIG. 3), thereby generating reconstructed residual data. Inverse transform module 710 provides the reconstructed residual data to reconstruction unit 712.

Reconstruction unit 712 receives prediction blocks from motion compensation unit 702 and intra-prediction unit 704. Reconstruction unit 712 also receives corresponding reconstructed residual data from inverse transform module 710. Reconstruction unit 712 performs a reconstruction operation that uses reconstructed residual data of a CU and a prediction block for the CU to generate a reconstructed sample block for the CU. In various examples, reconstruction unit 712 may perform various reconstruction operations. For example, reconstruction unit 712 may generate the reconstructed sample block of the CU by adding the samples in the reconstructed residual data of the CU with corresponding samples in the prediction block of the CU.

After generating a reconstructed sample block for a CU, reconstruction unit 712 outputs the reconstructed sample block. Reconstruction unit 712 also provides the reconstructed sample block to reference frame store 714. Reference frame store 714 stores the reconstructed sample block. Motion compensation unit 702 and/or intra-prediction unit 704 may subsequently use the reconstructed sample block to generate additional prediction blocks.

Figure 8:
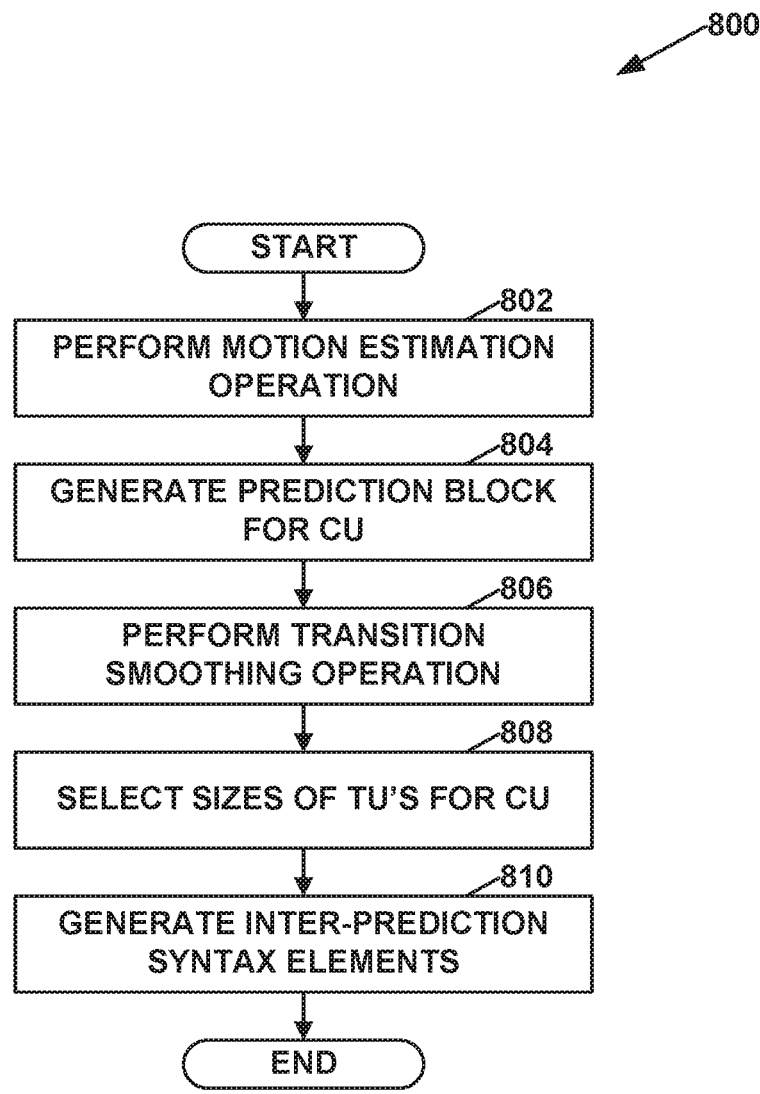
FIG. 8 is a flowchart that illustrates an example inter-frame coding operation performed by an inter-prediction unit.

FIG. 8 is a flowchart that illustrates an example inter-frame coding operation 800 performed by inter-prediction unit 304. After encoding unit 104 starts inter-frame coding operation 800, motion estimation unit 602 performs a motion estimation operation on PUs of the CU (802). In some instances, motion estimation unit 602 may perform the motion estimation operation for a PU by searching within a search area of a reference frame for a reference sample for the PU. The reference sample for the PU may be a portion of the reference frame that corresponds to prediction area specified by the prediction tree of the PU. If motion estimation unit 602 finds a reference sample for the PU, motion estimation unit 602 may generate a motion vector that indicates a difference in position between the PU and the reference sample for the PU. In other instances, motion estimation unit 602 may predict a motion vector for the PU.

Within this general framework, various examples of motion estimation unit 602 may perform the motion estimation operation in various ways. For example, different examples of motion estimation unit 602 may use different search areas when searching for a portion of the reference frame that corresponds to a PU. In some such examples, encoding unit 104 has a search area parameter that controls the size of the search area used by motion estimation unit 602. The value of the search area parameter may be set by a human user or by a computer program.

After performing the motion estimation operation on the PUs of the CU, motion compensation unit 604 performs a motion compensation operation to generate a prediction block for the CU (804). Furthermore, during performance of operation 800, smoothing unit 608 may perform an operation that adaptively performs a smoothing operation on samples in a transition zone of the prediction block (806). The smoothing operation may smooth the samples in a transition zone of the prediction block. The transition zone may occur at a boundary between samples of the prediction block associated with the different PUs of the CU. For example, the transition zone may occur at a boundary between samples of the prediction block associated with a first PU of the CU and samples of the prediction block associated with a second PU. A sample of the prediction block may be associated with a PU when the sample is within a prediction area specified by a prediction tree of the PU.

In some examples, smoothing a sample in the transition area may reduce differences between the sample and samples that neighbor the sample. As described elsewhere in this disclosure, smoothing unit 608 may improve coding efficiency and/or a visual appearance of the decoded sample block of the CU by performing the smoothing operation. In various examples, smoothing unit 608 performs various smoothing operations. FIGS. 12-18 and 20, described in detail elsewhere in this disclosure, illustrate example operations performed by smoothing unit 608 to adaptively smooth samples in the transition zones of prediction blocks.

In addition, TU generation unit 606 may perform a transform selection operation to select sizes of TUs for the CU (808). As discussed above, transform module 312 may receive residual data for the CU. Transform module 312 may then perform a transform operation on each TU of the CU. When transform module 312 performs the transform operation on a TU, transform module 312 may apply a transform to samples of the residual data that correspond to the TU, thereby generating a transform coefficient block for the TU. Samples of the residual data may correspond to a TU when the samples are within the transform area specified by the transform tree of the TU. Inverse transform unit 320 in encoding unit 104 and inverse transform module 710 in decoding unit 106 also use transforms having the selected transform sizes when transforming transform coefficient blocks into sample blocks.

Furthermore, inter-prediction unit 304 may generate inter-prediction syntax elements (810). The inter-prediction syntax elements may provide information about the CU and the prediction block. For example, the inter-prediction syntax elements may include syntax elements that indicate whether the CU has more than one PU. In this example, if the CU has more than one PU, the inter-prediction syntax elements may also indicate sizes, shapes, and/or locations of the prediction areas of the PUs. In another example, the inter-prediction syntax elements may specify inter-prediction modes for the PUs of the CU. Furthermore, the inter-prediction syntax elements may include data based on motion vectors for one or more of the PUs of the CU. In another example, the inter-prediction syntax elements may indicate sizes and/or location of TUs of the CU. In some examples, the set of inter-prediction syntax elements includes some or all of the inter-prediction syntax elements specified by the H.264 MPEG Part 10 standard.

If mode select unit 302 selects the prediction block generated in step 804, inter-prediction unit 304 may output the prediction block to residual generation unit 310 and reconstruction unit 322. Furthermore, if mode select unit 302 selects the prediction block generated in step 804, mode select unit 302 may include the inter-prediction syntax elements in the coding node, prediction tree, and/or transform tree of the CU.

Figure 9:
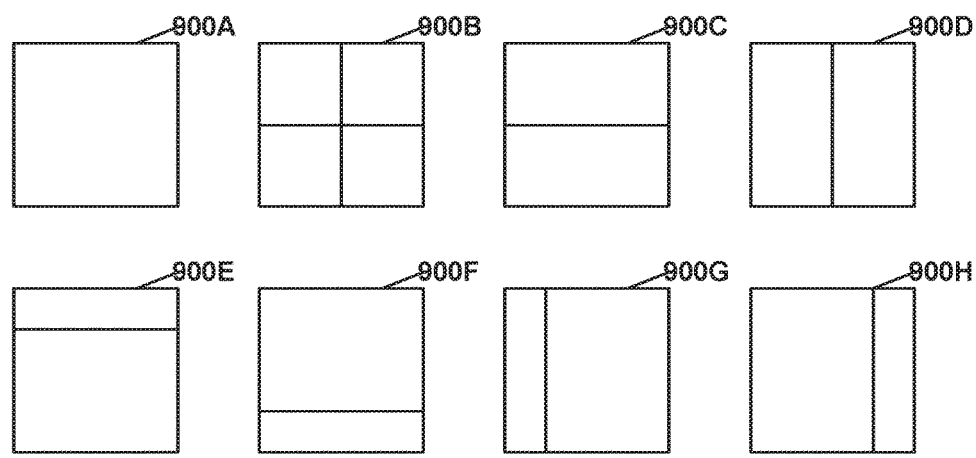
FIG. 9 is a conceptual diagram that illustrates example rectangular partitioning modes.

FIG. 9 is a conceptual diagram that illustrates example rectangular partitioning modes. As explained briefly above, motion estimation unit 602 may generate one or more PUs for a CU. Each of the PUs may have a prediction tree that specifies a size and a position of a prediction area. Each of the prediction areas may correspond to a different partition of the sample block of the CU. For ease of explanation, this disclosure may explain that a PU corresponds to a partition of the sample block of a CU when the prediction area specified by the prediction tree of the PU corresponds to the partition of the sample block of the CU.

In various examples, motion estimation unit 602 may use various partitioning modes to generate the PUs of the CU. Such partitioning modes may include rectangular partitioning modes. In rectangular partitioning modes, the PUs correspond to rectangular-shaped partitions of the sample block of the CU. In some examples, motion estimation unit 602 is able to use some or all rectangular partitioning modes defined in the H.264 MPEG Part 10 standard.

The example of FIG. 9 illustrates rectangular partitioning modes 900A-H (collectively, "rectangular partitioning modes 900"). In rectangular partitioning mode 900A, motion estimation unit 602 generates a single PU for the CU. The prediction area of this PU is the same size as the sample block of the CU. In rectangular partitioning mode 900B, motion estimation unit 602 generates four PUs for the CU. The PUs generated using rectangular partitioning mode 900B correspond to four equally-sized partitions of the sample block of the CU.

In rectangular partitioning modes 900C through 900H, motion estimation unit 602 generates two PUs for the CU. The PUs generated using rectangular partitioning mode 900C correspond to equally-sized, horizontally-divided partitions of the sample block of the CU. The PUs generated using rectangular partitioning mode 900D correspond to equally-sized, vertically-divided partitions of the sample block of the CU.

The PUs generated using rectangular partitioning mode 900E correspond to horizontally-divided partitions of the sample block in which the lower partition is larger than the upper partition. In some examples, motion estimation unit 602 may partition the sample block horizontally at any sample in the sample block above a horizontal midline of the sample block. The PUs generated using rectangular partitioning mode 900F correspond to horizontally-divided partitions of the sample block in which the lower partition is smaller than the upper partition. In some examples, motion estimation unit 602 may partition the sample block horizontally at any sample in the sample block below a horizontal midline of the sample block.

The PUs generated using rectangular partitioning mode 900G correspond to vertically-divided partitions of the sample block in which the left partition is smaller than the right partition. In some examples, motion estimation unit 602 may partition the sample block vertically at any sample in the sample block to the left of a vertical midline of the sample block. The PUs generated using rectangular partitioning mode 900H correspond to vertically-divided partitions of the sample block in which the left partition is larger than the right partition. In some examples, motion estimation unit 602 may partition the sample block vertically at any sample in the sample block to the right of a vertical midline of the sample block.

Figure 10:
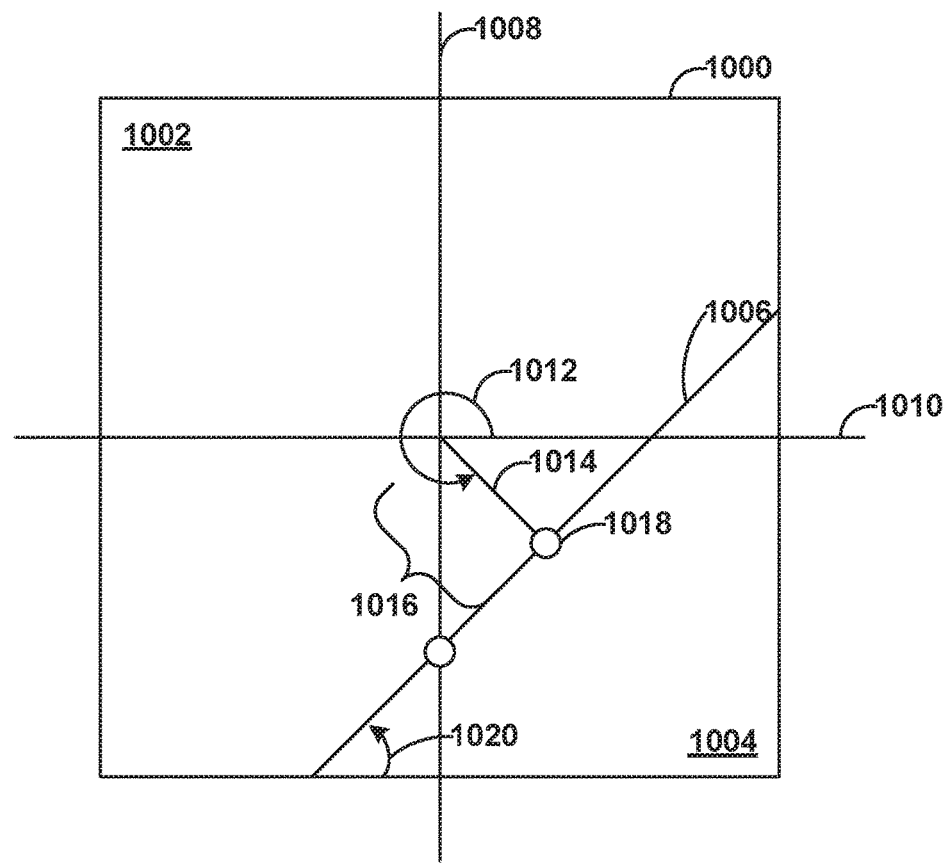
FIG. 10 is a conceptual diagram that illustrates example geometric partitioning modes.

FIG. 10 is a conceptual diagram that illustrates example geometric partitioning modes. In some examples, motion estimation unit 602 uses a geometric partitioning mode to generate two PUs for a CU. When motion estimation unit 602 uses a geometric partitioning mode to generate the PUs for the CU, the PUs correspond to partitions of the sample block of the CU whose boundaries do not necessarily meet the edges of the sample block at right angles.

In the example of FIG. 10, motion estimation unit 602 has used a geometric partitioning mode to partition a sample block 1000 into a first partition 1002 and a second partition 1004. A partitioning line 1006 separates first partition 1002 and second partition 1004. For ease of explanation, FIG. 10 illustrates a vertical midline 1008 and a horizontal midline 1010 of sample block 1000. Two parameters define the geometric partitioning mode used to partition sample block 1000. In this disclosure, these two parameters are referred to as theta and rho. The theta parameter indicates an angle 1012 at which a line 1014 extends from a central point of sample block 1000. The rho parameter indicates a length 1016 of line 1014. Thus, the theta and rho parameters act as polar coordinates to indicate a point 1018 within sample block 1000. Partitioning line 1006 is defined such that partitioning line 1006 meets line 1014 at a right angle. In the example of FIG. 10, an angle 1020 at which partitioning line 1006 meets an edge of sample block 1000 is not a right angle. In this way, the theta and rho parameters define the location of partitioning line 1006. By using various values for the theta and rho parameters, motion estimation unit 602 may define various lines that partition sample block 1000.

Partitioning line 1006 and line 1014 are not necessarily visually present in sample block 1000 and are shown in FIG. 10 to illustrate how sample block 1000 may be geometrically partitioned.

Figure 11:
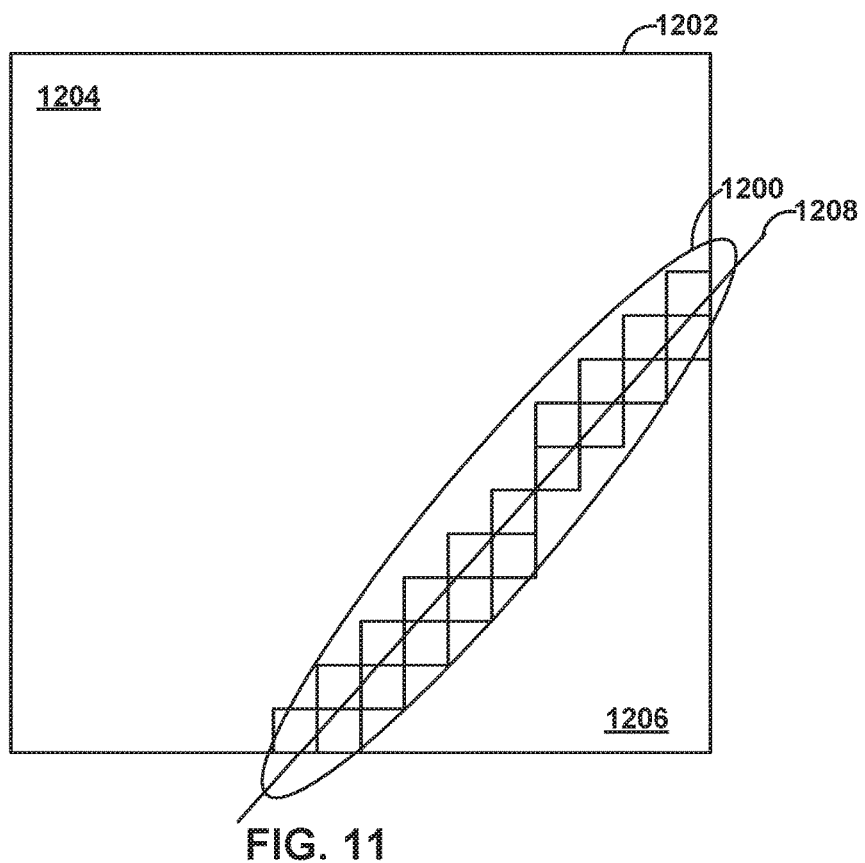
FIG. 11 is a conceptual diagram that illustrates a transition zone of a CU.

FIG. 11 is a conceptual diagram that illustrates a transition zone 1200 of a prediction block 1202 of a CU. In the example of FIG. 11, prediction block 1202 includes samples 1204 associated with a first PU of the CU and samples 1206 associated with a second PU of the CU. A partitioning line 1208 separates samples 1204 from samples 1206. Transition zone 1200 is a portion of prediction block 1202 occurring at a boundary between samples 1204 and samples 1206. In the example of FIG. 11, samples in transition zone 1200 are shown as blocks.

FIGS. 12-18 and 20, described in detail below, illustrate example operations to adaptively smooth samples in transition zones of prediction blocks. In each of these example operations, smoothing unit 608 determines whether to perform a smoothing operation on samples in the transition zone. In some circumstances, the coding efficiency of a CU may be enhanced by smoothing samples in the transition zone. In other circumstances, the coding efficiency of the CU may be decreased by smoothing samples in the transition zone. Thus, by adaptively performing a smoothing operation on samples in the transition zone, encoding unit 104 may enhance the coding efficiency of the CU.

Figure 12:
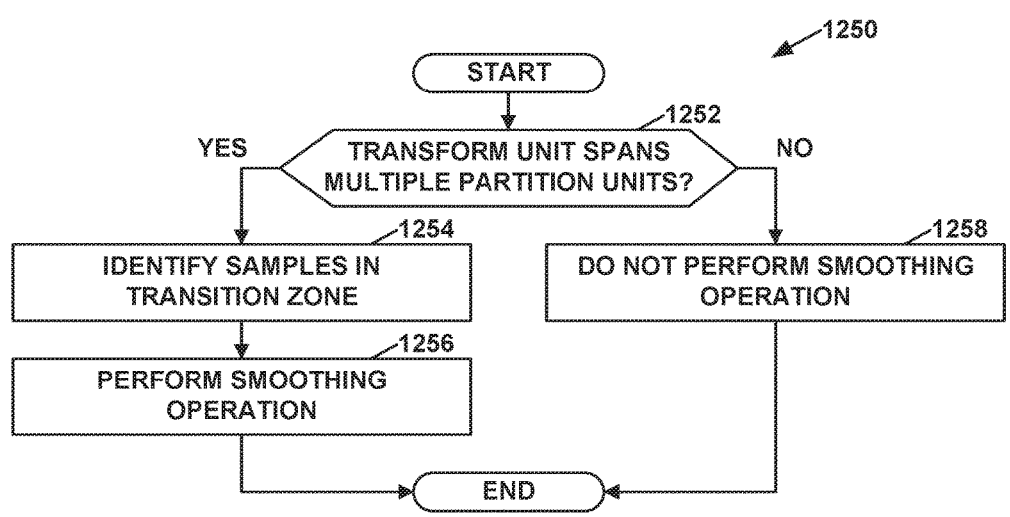
FIG. 12 is a flowchart that illustrates an example operation to adaptively smooth samples in a transition zone of a prediction block.

FIG. 12 is a flowchart that illustrates an example operation 1250 to adaptively smooth samples in a transition zone of a prediction block. Smoothing unit 608 may perform operation 1250 as an alternative to the example operations illustrated in FIGS. 13-18 and 20.

As discussed above, residual generation unit 310 may subtract samples of the prediction block from samples of the CU to generate residual data. Inter-prediction unit 304 may generate one or more TUs for the CU. Each of the TUs specifies a transform area. The residual data of the CU is partitioned among the TUs. For ease of explanation, this disclosure may describe portions of the residual data of the CU within the transform area of a TU as being within the TU. For each TU, transform module 312 applies a transform to portions of the residual data of the CU in the TU to generate a transform coefficient block for the TU.

A TU of a CU may span two or more PUs of the CU when the transform area of the TU overlaps with the prediction areas of the PUs. When a TU of a CU spans two or more PUs of the CU, it is more likely that there are sharp discontinuities in the color or brightness between samples on opposite sides of the partition line between the PUs. In some examples, transform module 312 generates a transform coefficient block having more significant (i.e., non-zero) coefficients when transform module 312 applies transforms to TUs having samples with sharp discontinuities than when transform module 312 applies transforms to TUs that do not have samples with sharp discontinuities.

Applying a smoothing filter to samples in the transition zone may reduce the discontinuities in the color or brightness between samples on opposite sides of the partition line between portions of the prediction block associated with different PUs. Because the discontinuities may be reduced by applying the smoothing filter, transform module 312 may generate a transform coefficient block having fewer significant coefficients.

However, if the TU occurs entirely within one PU, applying a smoothing filter to samples in the TU may increase the differences between the prediction block of the CU and the original sample block of the CU, resulting in more complex residual data. Transform module 312 may generate a transform coefficient block having more significant coefficients for more complex residual data.

After smoothing unit 608 starts operation 1250, smoothing unit 608 determines whether a TU of the CU spans multiple PUs of the CU (1252). If smoothing unit 608 determines that a TU of the CU spans multiple PUs of the CU, smoothing unit 608 makes the determination to perform the smoothing operation on samples in the transition zone of the prediction block of the CU. Thus, if smoothing unit 608 determines that a TU of the CU spans multiple PUs of the CU ("YES" of 1252), smoothing unit 608 identifies samples in a transition zone of the prediction block of the CU (1254) and performs the smoothing operation on the samples in the transition zone (1256). Otherwise, if smoothing unit 608 determines that a TU does not span multiple PUs ("NO" of 1252), smoothing unit 608 does not perform the smoothing operation on samples in the transition zone (1258).

In various examples, smoothing unit 608 identifies the samples in the transition zone in various ways. For example, smoothing unit 608 may use the example transition sample identification operation illustrated in FIG. 20 or the example transition sample identification operation illustrated in FIG. 21 to identify samples in the transition zone.

In various examples, smoothing unit 608 may perform various smoothing operations on the samples in the transition zone. For example, smoothing unit 608 may perform an Overlapped-Block Motion Compensation (OBMC) smoothing operation on the samples in the transition zone. In an OBMC smoothing operation, smoothing unit 608 generates two predictions for each of the samples in the transition zone. Smoothing unit 608 generates the first prediction for a given sample by identifying a sample of a reference frame indicated by a motion vector of one of the PUs. Smoothing unit 608 generates the second prediction for the given sample by identifying a sample of the reference frame indicated by a motion vector of the other one of the PUs. If one of the PUs does not have a motion vector, smoothing unit 608 may generate a prediction by identifying a sample of the reference frame at the same spatial locations as the given sample.

Furthermore, in an OBMC smoothing operation, smoothing unit 608 blends the predictions for each sample in the transition zone. In various examples, smoothing unit 608 blends the predictions for a given sample in various ways. For example, smoothing unit 608 may blend the predictions for a given sample by calculating a weighted average of the predictions. In various examples, smoothing unit 608 may give different weights to the predictions. For example, smoothing unit 608 may give a weight of ¾ to the prediction based on the motion vector of the PU containing a given sample and may give a weight of ¼ to the prediction based on the motion vector of the other PU.

In other examples, smoothing unit 608 may perform a filter-based smoothing operation. When smoothing unit 608 performs a filter-based smoothing operation, smoothing unit 608 may apply one or more filters to the samples in the transition zone. In such filter-based smoothing operations, smoothing unit 608 may apply various smoothing filters to the identified samples in the transition zone. In this example, smoothing unit 608 may apply the following 3×3 smoothing filter to each sample in the transition zone:

| | | |
|---|---|---|
| 1/15 | 2/15 | 1/15 |
| 2/15 | 3/15 | 2/15 |
| 1/15 | 2/15 | 1/15 |

In this example, when smoothing unit 608 applies the smoothing filter to a given sample, 1/15 of the new value of the given sample is based on the sample above and to the left of the given sample, 2/15 of the new value is based on the sample above the given sample, 1/15 of the new value is based on the sample above and to the right of the given sample, 2/15 of the new value is based on the sample to the left of the given sample, 3/15 of the new value is based on a current value of the given sample, 2/15 of the new value is based on the sample to the right of the given sample, 1/15 of the new value is based on the sample below and to the left of the given sample, 2/15 of the new value is based on the sample below the given sample, and 1/15 of the new value is based on the sample below and to the right of the given sample. Smoothing unit 608 may apply other smoothing filters to the samples in the transition zone. For example, smoothing unit 608 may apply smoothing filters with different weights. In another example, smoothing unit 608 may apply smoothing filters of other sizes, e.g., 5×5, 7×7, etc.

In some examples, operation 1250 is part of a method for coding video data. The method comprises generating a prediction block for a CU in a frame of the video data. The method also comprises determining, by a computing device, based on whether a TU of the CU spans multiple PUs of the CU whether to perform a smoothing operation on samples a transition zone of the prediction block. The transition zone is at a boundary between samples of the prediction block associated with a first PU of the CU and samples of the prediction block associated with a second PU of the CU. The method also comprises after the computing device makes a determination to perform the smoothing operation on the samples in the transition zone, performing the smoothing operation to smooth the samples in the transition zone of the prediction block.

In some examples, smoothing unit 608 may make the determination whether to perform the smoothing operation based on whether a TU spans multiple PUs and based on other factors. For example, smoothing unit 608 may make the determination whether to perform the smoothing operation based on whether a TU spans multiple PUs and based on the size of a PU of the CU.

Figure 13:
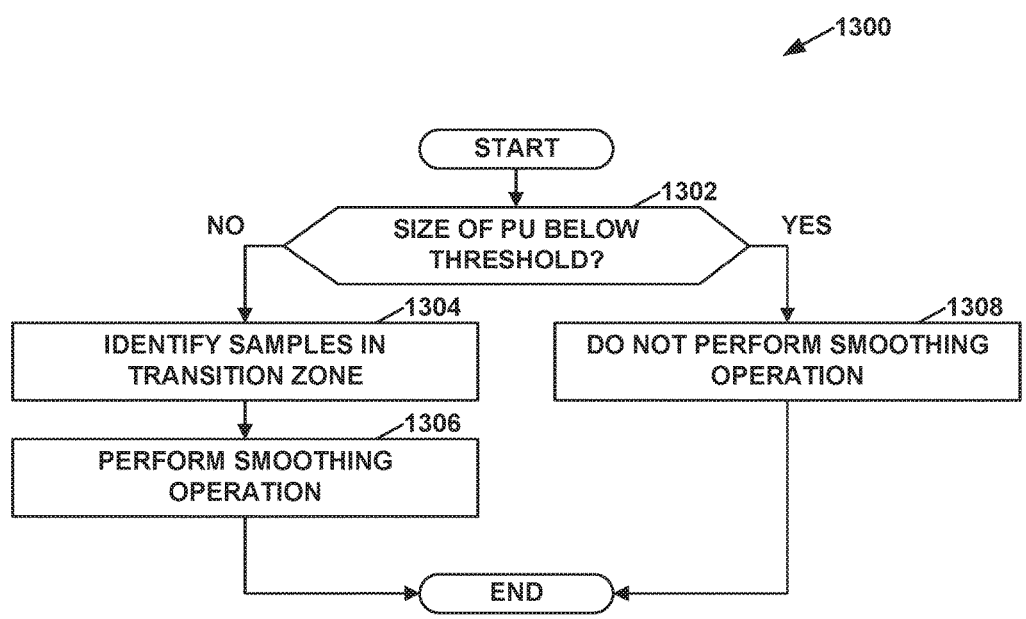
FIG. 13 is a flowchart that illustrates another example operation to adaptively smooth samples in a transition zone of a prediction block.

FIG. 13 is a flowchart that illustrates another example operation 1300 to adaptively smooth samples in a transition zone of a prediction block. Smoothing unit 608 may perform the operation 1300 as an alternative to performing the example operations illustrated in FIGS. 12, 14-18, and 20.

Smoothing unit 608 may perform operation 1300 to determine whether to perform a smoothing operation on samples in a transition zone of a prediction block. In operation 1300, smoothing unit 608 makes a determination whether to perform a smoothing operation on samples in the transition zone based on the sizes of the PUs of a CU. In some instances, the PUs of a CU may be relatively small. In such instances, smoothing samples in the transition zone between the PUs may not improve image quality or significantly improve coding efficiency.

After smoothing unit 608 starts operation 1300, smoothing unit 608 determines whether a size of one of the PUs is below a given threshold (1302). In some examples, the size of a PU is the size of a prediction area specified by a prediction tree of the PU. In various examples, smoothing unit 608 may determine whether the size of the PU is below various thresholds. For example, if a PU has size M×N, smoothing unit 608 may determine whether either of M or N is smaller than 4. In some examples, the given threshold is preconfigured into encoding unit 104 and decoding unit 106. In other examples, encoding unit 104 and decoding unit 106 programmatically determine the given threshold.

In various examples, smoothing unit 608 may determine whether the size of one of the PUs is below the given threshold in various ways. For example, encoding unit 104 may store a lookup table. The lookup table contains entries that correspond to different PU sizes. Each of the entries indicates whether the corresponding PU size is above or below the given threshold.

If the sizes of the PUs are not below the given threshold ("NO" of 1302), smoothing unit 608 makes the determination to perform the smoothing operation on samples in the transition zone. For example, if a PU has size M×N, smoothing unit 608 may make the determination to perform the smoothing operation on the samples in the transition zone when either M or N is four or greater. Hence, if the sizes of the PUs are not below the given threshold ("NO" of 1302), smoothing unit 608 identifies the samples in the transition zone (1304) and then performs the smoothing operation on the samples in the transition zone (1306). Otherwise, if the size of one of the PUs is below the given threshold ("YES" of 1302), smoothing unit 608 makes the determination not to perform the smoothing operation on samples in the transition zone (1308). In various examples, smoothing unit 608 may identify the samples in the transition zone in various ways. For example, smoothing unit 608 may use the example operations illustrated in FIGS. 19 and 21 to identify the samples in the transition zone. Furthermore, in various examples, smoothing unit 608 may perform various smoothing operations on the samples in the transition zone. For example, smoothing unit 608 may perform one or more OBMC or filter-based smoothing operations as described above with regard to FIG. 12.

In other examples, smoothing unit 608 may perform a version of operation 1300 in which smoothing unit 608 determines whether a size of a transform is below the threshold instead of determining whether a size of the PU is below the threshold. Transform module 312 may use the transform when converting residual data based on the prediction block from a spatial domain to a frequency domain. Thus, smoothing unit 608 may determine whether to perform the smoothing operation on the samples in the transition zone based on the size of the transform.

In some examples, operation 1300 is part of a method for coding video data. The method comprises generating a prediction block for a CU in a frame of the video data. The method also comprises determining, by a computing device, based on a size of a PU of the CU or based on a size of a transform, whether to perform a smoothing operation on samples a transition zone of the prediction block. The transition zone is at a boundary between samples of the prediction block associated with a first PU of the CU and samples of the prediction block associated with a second PU of the CU. The method also comprises after the computing device makes a determination to perform the smoothing operation on the samples in the transition zone, performing the smoothing operation to smooth the samples in the transition zone of the prediction block.

In some examples, smoothing unit 608 may make the determination whether to perform the smoothing operation based on the size of the PU or transform and based on other factors. For example, smoothing unit 608 may make the determination whether to perform the smoothing operation based on the size of the PU or transform and based on motion vectors of PUs of the CU.

Figure 14:
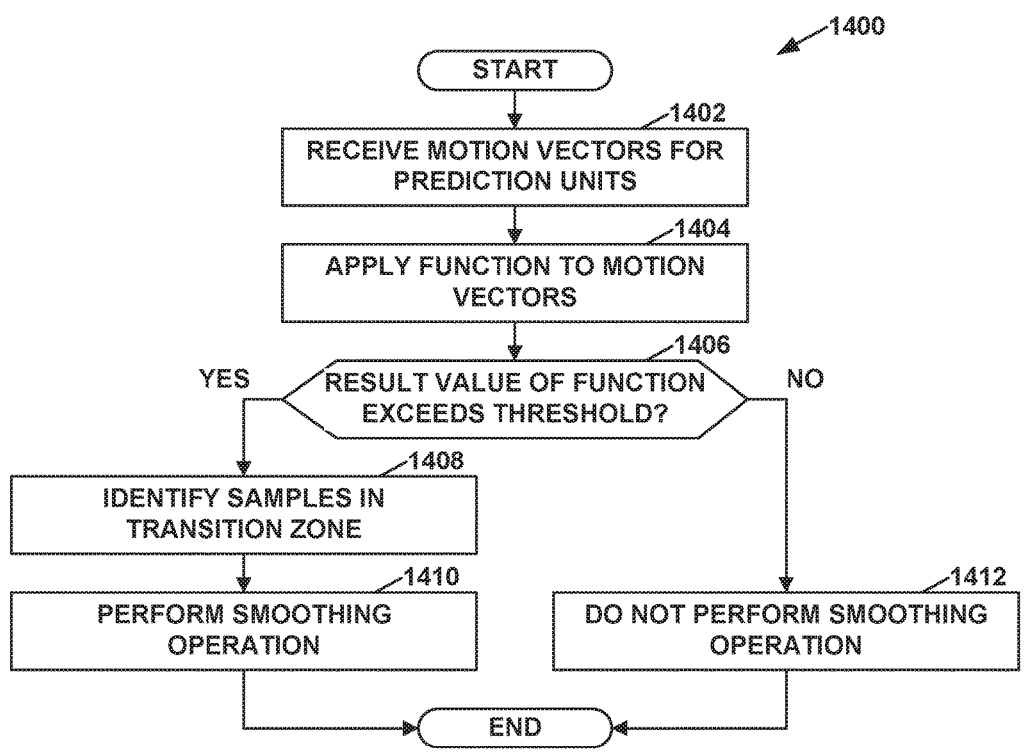
FIG. 14 is a flowchart that illustrates another example operation to adaptively smooth samples in a transition zone of a prediction block.

FIG. 14 is a flowchart that illustrates another example operation 1400 to adaptively smooth samples in a transition zone of a prediction block. Smoothing unit 608 may perform the operation 1400 as an alternative to performing the example operations illustrated in FIGS. 12, 13, 15-18, and 20.

When motion estimation unit 602 performs the motion estimation operation on the PUs of a CU, motion estimation unit 602 may generate a motion vector for each of the PUs. For example, if the CU has a first PU and a second PU, motion estimation unit 602 may generate a first motion vector and a second motion vector. The first motion vector indicates a difference in spatial location between the first PU and a first reference sample. The first reference sample is an area corresponding to the first PU within a reference frame. The second motion vector indicates a difference in spatial location between the second partition unit and a second reference sample. The second reference sample is an area corresponding to the second PU within the reference frame.

After smoothing unit 608 starts operation 1400, smoothing unit 608 receives motion vectors for PUs of a CU (1402). Smoothing unit 608 then applies a function to the motion vectors for the PUs (1404). The function produces a result value. In various examples, smoothing unit 608 may apply various functions to the motion vectors. For example, smoothing unit 608 may apply a function that calculates the absolute value of subtracting one of the motion vectors from the other motion vector. In another example, smoothing unit 608 may apply a function based on an amplitude of a motion vector determined for a neighboring PU and a predicted motion vector. In this example, the predicted motion vector may be predicted from one or more of: the motion vector determined for the neighboring prediction unit and a motion vector determined for a prediction unit co-located in the reference frame After applying the function to the motion vectors, smoothing unit 608 determines whether the result value exceeds a threshold (1406). In various examples, smoothing unit 608 may determine whether the result value exceeds various thresholds. For example, if the result is an absolute value of a difference between motion vectors, smoothing unit 608 may determine whether the result value is greater than the threshold. In this example, the threshold may be 1 integer pixel. In some examples, the threshold is a predetermined parameter that is set at both encoding unit 104 and decoding unit 106. In other examples, encoding unit 104 may generate a syntax element that specifies the threshold and provide the syntax element to decoding unit 106. For instance, encoding unit 104 may provide the threshold to decoding unit 106 as a syntax element in a sequence parameter set associated with the CU.

If the result value of the function exceeds the given threshold ("YES" of 1406), smoothing unit 608 makes the determination to perform the smoothing operation on samples in the transition zone. Hence, if the result value of the function exceeds the given threshold ("YES" of 1406), smoothing unit 608 identifies the samples in the transition zone (1408) and performs the smoothing operation on the samples in the transition zone (1410). Otherwise, if the result value of the function does not exceed the given threshold ("NO" of 1406), smoothing unit 608 does not perform the smoothing operation on samples in the transition zone (1412). In this way, smoothing unit 608 determines whether to perform the smoothing operation on samples in the transition zone based at least in part on a first motion vector and a second motion vector. In various examples, smoothing unit 608 may identify the samples in the transition zone in various ways. For example, smoothing unit 608 may use the example operations illustrated in FIGS. 19 and 21 to identify the samples in the transition zone. Furthermore, in various examples, smoothing unit 608 may perform various smoothing operations on the samples in the transition zone. For example, smoothing unit 608 may perform one or more OBMC or filter-based smoothing operations as described above with regard to FIG. 12.

In some examples, smoothing unit 608 may make the determination whether to perform the smoothing operation based on the motion vectors and based on other factors. For example, smoothing unit 608 may make the determination whether to perform the smoothing operation based on the motion vectors and based on the size of a PU of the CU. For instance, smoothing unit 608 may make the determination to perform the smoothing operation when the difference between the motion vectors is greater than a given threshold and the size of a PU in the CU exceeds a threshold.

Figure 15:
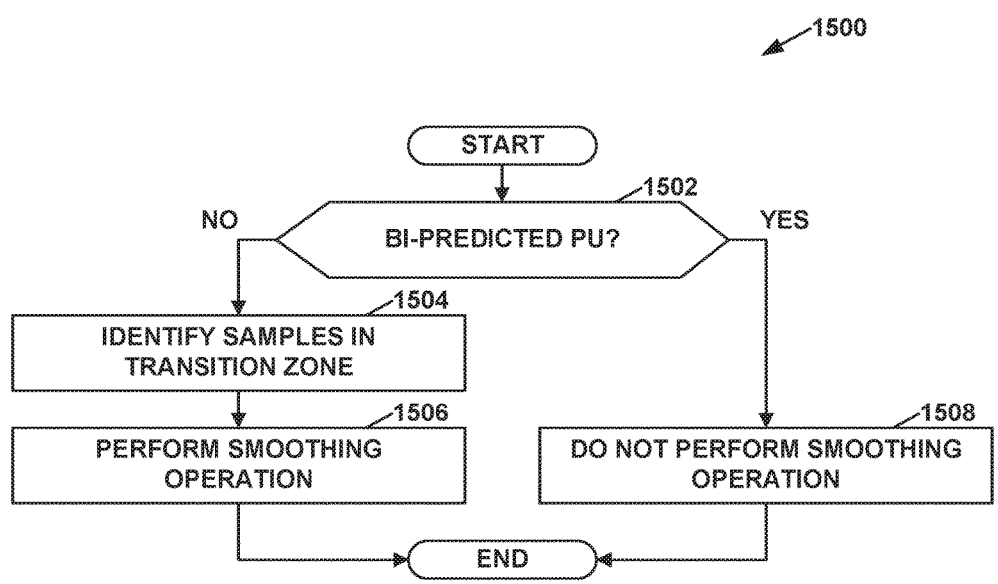
FIG. 15 is a flowchart that illustrates another example operation to adaptively smooth samples in a transition zone of a prediction block.

FIG. 15 is a flowchart illustrating another example operation 1500 to adaptively smooth samples in a transition zone of a prediction block. Inter-prediction unit 304 may perform smoothing determination operation 1500 as an alternative to performing the example operations illustrated FIGS. 12-14, 16-18, and 20. In the example of FIG. 15, smoothing unit 608 determines whether to perform a smoothing operation on samples in a transition zone of residual data of a given CU based on inter-prediction directionalities of PUs of the given CU. The inter-prediction directionality of a PU may determine whether the portion of the prediction block of a CU associated with the PU is based on reference samples from one or two reference frames.

Encoding unit 104 may encode a frame as an intra-frame (i.e., an "I-frame"), a prediction frame (i.e., a "P-frame"), or a bi-directional prediction frame (i.e., a "B-frame"). Similarly, encoding unit 104 may encode a slice of a frame as an intra-slice (i.e., an "I-slice"), a prediction slice (i.e., a "P-slice"), or a bi-directional slice (i.e., a "B-slice"). If encoding unit 104 encodes the frame or slice as an I-frame or an I-slice, PUs within the frame or slice may only be intra-predicted PUs. If encoding unit 104 encodes a frame or slice as a P-frame or a P-slice, PUs within the frame or slice may be intra-predicted PUs or uni-predicted PUs. If encoding unit 104 encodes a frame or slice as a B-frame or a B-slice, PUs within the frame or slice may be intra-predicted PUs, un-predicted PUs, or bi-predicted PUs. Motion compensation unit 604 and/or motion compensation unit 702 may generate portions of the prediction block that are associated with an intra-predicted PU without reference to other frames or slices. Motion compensation unit 604 and/or motion compensation unit 702 may generate portions of the prediction block that are associated with a uni-predicted PU based on a single reference frame in the video data. In some instances, a CU that has only uni-predicted PUs may be referred to as a uni-predicted or uni-prediction CU. Motion compensation unit 604 and/or motion compensation unit 702 may generate portions of the prediction block that are associated with a bi-predicted PU based on two reference frames. In some instances, a CU that includes one or more bi-predicted PUs may be referred to as a bi-predicted or bi-prediction CU.

For example, when a given PU is a uni-predicted PU, encoding unit 104 searches a single reference frame for reference samples for the given PU. This single reference frame may temporally occur before or after the frame of the given PU. In other words, the single reference frame may be in LIST_0 or in LIST_1. Encoding unit 104 may then use the reference samples of the given PU to generate the portions of a prediction block for a CU that are associated with the given PU.

When a given PU is a bi-predicted PU, encoding unit 104 may search two reference frames to obtain two reference samples for the given PU. One of the reference frames may temporally occur before the frame of the given PU and one of the reference frames may temporally occur after the frame of the given PU. To generate the prediction block of a CU, encoding unit 104 may perform a blending operation with respect to the given PU. When encoding unit 104 performs the blending operation with respect to the given PU, encoding unit 104 may generate portions of the prediction block that are associated with the given PU based on the two reference samples of the given PU. For instance, encoding unit 104 may generate portions of the prediction block that are associated with the given PU based on a weighted average of samples in the two reference samples of the given PU.

Comparatively more data may need to be retrieved from memory to perform an OBMC smoothing operation on samples in the prediction block of a CU that includes a bi-predicted PU (i.e., a bi-prediction CU) than to perform the OBMC smoothing operation on samples in the prediction block of a CU that does not include a bi-predicted PU. Hence, refraining from performing the smoothing operation when the CU includes a bi-predicted PU may decrease the amount of data retrieved from memory and accelerate the encoding or decoding process.

As illustrated in the example of FIG. 15, smoothing unit 608 may determine whether a CU has a bi-predicted PU (1502). If the CU does not have a bi-predicted PU ("NO" of 1502), smoothing unit 608 makes the determination to perform the smoothing operation on samples of the transition zone of the prediction block of the CU. Hence, if the CU does not have a bi-predicted PU ("NO" of 1502), smoothing unit 608 identifies the samples in the transition zone (1504) and performs the smoothing operation on the samples in the transition zone (1506). In other examples, smoothing unit 608 may make the determination to perform the smoothing operation on the samples in the transition zone when the CU has a bi-predicted PU. In another example, the CU may have two PUs and one of the PUs is a bi-predicted PU. To perform an OBMC smoothing operation, smoothing unit 608 may need to derive a subset of samples in the transition regions using the two reference samples of the bi-predicted PU (which would increase the amount of data retrieved from memory as explained before). Hence, in this example, smoothing unit 608 may make the determination not to perform the OBMC smoothing operation on the subset of samples of the transition region that are associated with the bi-predicted PU. Smoothing unit 608 may also make the determination to perform the OBMC smoothing operation on other samples of the transition region that are associated with the other PU based on whether the other PU is a bi-predicted PU.

In various examples, smoothing unit 608 may identify the samples in the transition zone in various ways. For example, smoothing unit 608 may use the example operations illustrated in FIGS. 19 and 21 to identify the samples in the transition zone. Furthermore, in various examples, smoothing unit 608 may perform various smoothing operations on the samples in the transition zone. For example, smoothing unit 608 may perform one or more OBMC or filter-based smoothing operations as described above with regard to FIG. 12.

Otherwise, if the CU has a bi-predicted PU ("YES" of 1502), smoothing unit 608 does not perform the smoothing operation on samples in the transition zone of the prediction block of the CU (1508). Thus, if the CU has a bi-predicted PU, smoothing unit 608 does not apply the smoothing operation to samples in the transition zone of the prediction block. In this way, smoothing unit 608 makes the determination whether to perform the smoothing operation based on the inter-prediction directionality of PUs of the CU, and hence the inter-prediction directionalities of the CU.

In some examples, smoothing unit 608 may make the determination whether to perform the smoothing operation based on the inter-prediction directionalities of the PUs of a CU and based on other factors. For example, smoothing unit 608 may make the determination whether to perform the smoothing operation based on the inter-prediction directionalities of the PUs and based on the size of a PU of the CU. For instance, smoothing unit 608 may make the determination to perform the smoothing operation when the CU does not have a bi-prediction PU and the size of a PU in the CU exceeds a threshold.

Figure 16:
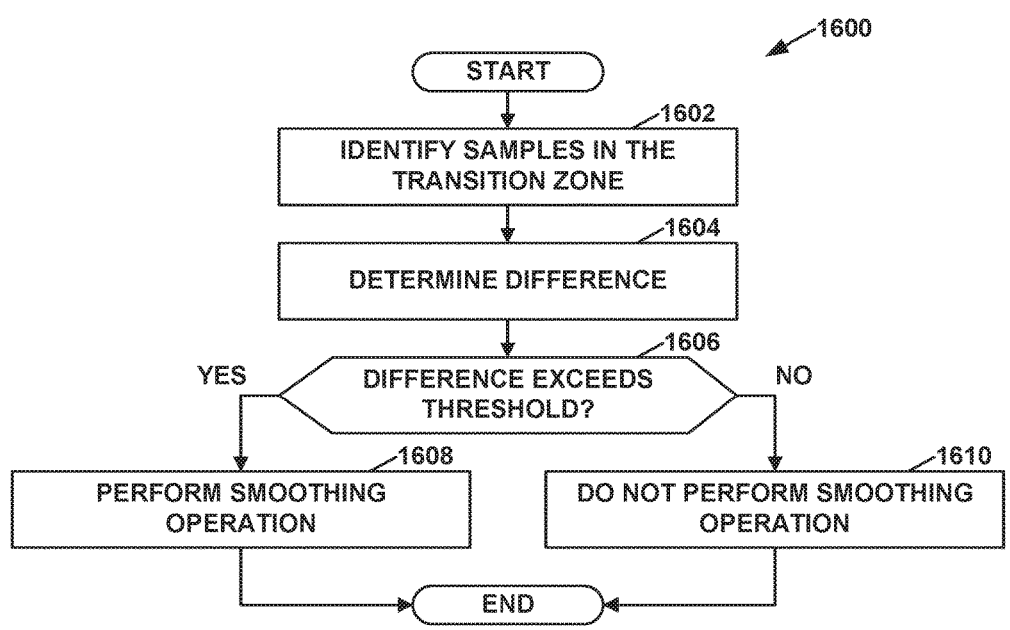
FIG. 16 is a flowchart that illustrates another example operation to adaptively smooth samples in a transition zone of a prediction block.

FIG. 16 is a flowchart illustrating another example operation 1600 to adaptively smooth samples in a transition zone of a prediction block. Smoothing unit 608 may perform operation 1600 as an alternative to performing the operations illustrated in the examples of FIGS. 12-15, 17, 18, and 20.

When inter-prediction unit 304 performs operation 1600, smoothing unit 608 identifies samples in the transition zone of a prediction block of a CU (1602). In various examples, smoothing unit 608 may identify the samples in the transition zone in various ways. For example, smoothing unit 608 may use the example operations illustrated in FIGS. 19 and 21 to identify the samples in the transition zone.

After identifying the samples in the transition zone, smoothing unit 608 determines an amount of difference between samples in the transition zone that are associated with different PUs of the CU (1604). For example, smoothing unit 608 may determine an amount of difference between samples in the transition zone that are associated with a first PU of the CU and samples in the transition zone that are associated with a second PU of the CU.

Smoothing unit 608 then determines whether the amount of difference between the samples on opposite sides of the partitioning line exceeds a given threshold (1606). In different examples, smoothing unit 608 determines whether the amount of difference exceeds various thresholds. For example, smoothing unit 608 may determine whether the amount of difference between corresponding samples on opposite sides of the partitioning line is larger than two. In some examples, human users may configure the given threshold. In other examples, encoding unit 104 and decoding unit 106 determine the given threshold programmatically.

If the difference between samples on opposite sides of the partitioning line exceeds the given threshold ("YES" of 1606), smoothing unit 608 may perform a smoothing operation on samples in the transition zone (1608). For example, smoothing unit 608 may perform a smoothing operation on the samples in the transition zone if the difference between corresponding samples on opposite sides of the partitioning line is two or less. In various examples, smoothing unit 608 may perform various smoothing operations on the samples. For example, smoothing unit 608 may perform an OBMC-based or a filter-based smoothing operation on samples in the transition zone as described above with regard to FIG. 12. Otherwise, if the difference between samples in opposites sides of the partitioning line does not exceed the given threshold ("NO" of 1606), smoothing unit 608 does not perform the smoothing operation on the samples in the transition zone (1610). In this way, smoothing unit 608 may determine whether to perform the smoothing operation based at least in part on an amount of difference between samples in the transition zone that are associated with one PU of the CU and samples in the transition zone that are associated with another PU of the CU.

In some examples, smoothing unit 608 may make the determination whether to perform the smoothing operation based on the amount of difference between samples in the transition zone that are associated with different PUs and based on other factors. For example, smoothing unit 608 may make the determination whether to perform the smoothing operation based on the amount of difference between samples in the transition zone that are associated with different PUs and based on the size of a PU of the CU.

Figure 17:
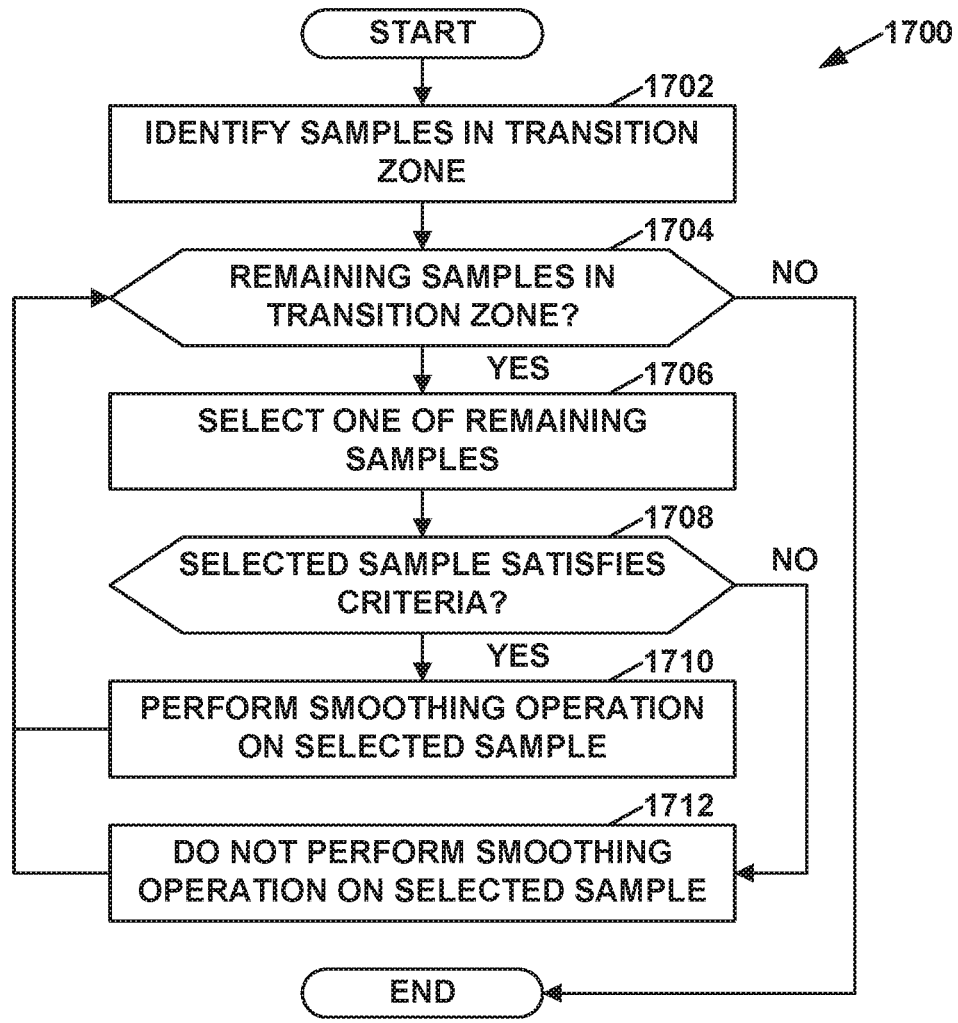
FIG. 17 is a flowchart that illustrates another example operation to adaptively smooth samples in a transition zone of a prediction block.

FIG. 17 is a flowchart that illustrates another example operation 1700 to adaptively smooth samples in a transition zone of a prediction block. Smoothing unit 608 may perform operation 1700 as an alternative to performing the example operations illustrated in FIGS. 12-16, 18, and 20. When inter-prediction unit 304 performs operation 1700, inter-prediction unit 304 may perform smoothing operations on samples in the transition zone selectively. In other words, inter-prediction unit 304 does not necessarily smooth all samples in the transition zone.

When inter-prediction unit 304 performs operation 1700, smoothing unit 608 performs a transition sample identification operation to identify samples in a transition zone of a prediction block of a CU (1702). In various examples, smoothing unit 608 may perform various transition sample identification operations. For example, smoothing unit 608 may perform the example transition sample identification operation illustrated in FIG. 19 or the example transition sample identification operation illustrated in FIG. 21.

After identifying the samples in the transition zone, smoothing unit 608 determines whether there are remaining samples in the transition zone (1704). If there are one or more remaining samples in the transition zone ("YES" of 1704), smoothing unit 608 selects one of the remaining samples in the transition zone (1706). After smoothing unit 608 selects the sample, smoothing unit 608 may not consider the sample to be a remaining sample.

Smoothing unit 608 then determines whether the selected sample satisfies particular criteria (1708). If the selected sample satisfies the criteria ("YES" of 1708), smoothing unit 608 performs a smoothing operation on the selected sample (1710). For example, smoothing unit 608 may perform an OBMC-based or a filter-based smoothing operation on the selected sample. If the selected sample does not satisfy the criteria ("NO" of 1708), smoothing unit 608 does not perform the smoothing operation on the selected sample (1712). In either case, smoothing unit 608 again determines whether there are remaining samples in the transition zone (1704). If there are remaining samples in the transition zone, smoothing unit 608 may repeat steps 1706, 1708, 1710, and 1712 with regard to the remaining samples.

In various examples, smoothing unit 608 may determine whether the selected sample satisfies various criteria. For example, smoothing unit 608 may determine that the selected sample satisfies the criteria if the selected sample is in a given PU of CU. In this example, smoothing unit 608 may determine that the selected sample does not satisfy the criteria if the selected sample is in another PU of the CU. In this way, smoothing unit 608 may perform a smoothing operation on samples in the given PU, but not samples in the other PU. For instance, when smoothing unit 608 performs the smoothing operation, smoothing unit 608 modifies samples in the transition zone that are associated with a first PU of the CU and does not modify samples in the transition zone that are associated with a second PU of the CU.

In another example, smoothing unit 608 may receive a sequence parameter set (SPS). In this example, smoothing unit 608 may determine that a sample satisfies the criteria if the SPS specifies the samples. In this example, smoothing unit 608 may determine that the sample does not satisfy the criteria if the SPS does not specify the sample.

Figure 18:
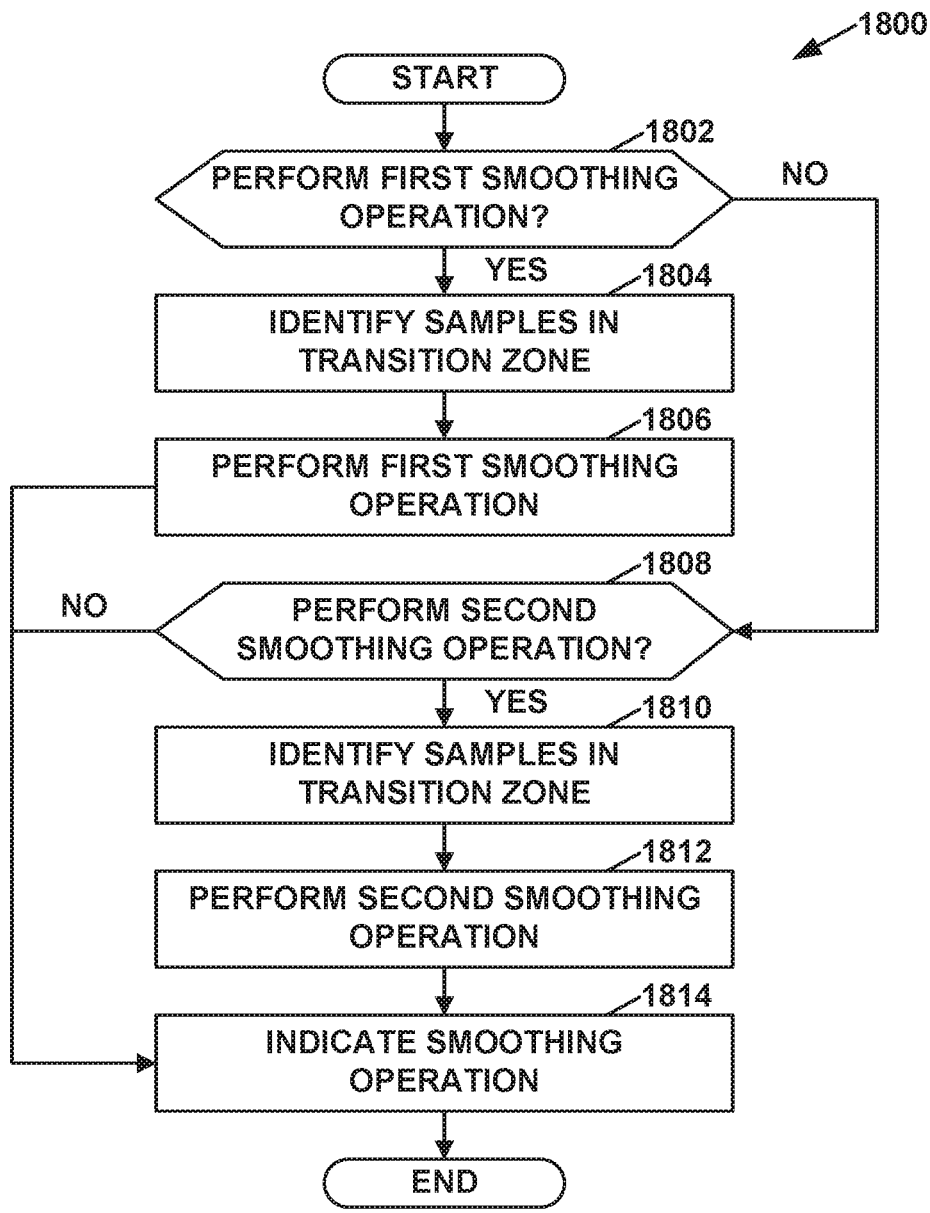
FIG. 18 is a flowchart that illustrates another example operation to adaptively smooth samples in a transition zone of a prediction block.

FIG. 18 is a flowchart illustrating another example operation 1800 to adaptively smooth samples in a transition zone of a prediction block. Inter-prediction unit 304 may perform operation 1800 as an alternative to performing the example operations illustrated in FIGS. 12-17 and 20. In the example of FIG. 18, smoothing unit 608 adaptively chooses a smoothing operation from among a plurality of available smoothing operations. In some examples, adaptively choosing a smoothing operation from among multiple available smoothing operations may result in greater coding efficiency and/or image quality.

After smoothing unit 608 starts operation 1800, smoothing unit 608 determines whether to perform a first smoothing operation on samples in the transition zone of a prediction block of a CU (1802). If smoothing unit 608 makes the determination to perform the first smoothing operation on the samples in the transition zone ("YES" of 1802), smoothing unit 608 may identify the samples in the transition zone (1804) and then perform the first smoothing operation on the samples in the transition zone (1806). In various examples, smoothing unit 608 may make the determination to perform the first smoothing operation in various ways. For example, smoothing unit 608 may use the example operations illustrated in FIGS. 12-17 to make the determination whether to perform the first smoothing operation. In this example, smoothing unit 608 may make the determination to apply the first smoothing operation to samples in the transition zone if the size of the CU is 32×32 or 16×16.

Otherwise, if smoothing unit 608 makes the determination not to perform the first smoothing operation ("NO" of 1802), smoothing unit 608 may determine whether to perform a second smoothing operation on the samples in the transition zone (1808). If smoothing unit 608 makes the determination to perform the second smoothing operation on samples in the transition zone ("YES" of 1808), smoothing unit 608 may identify samples in the transition zone (1810) and perform the second smoothing operation on samples in the transition zone (1812). In various examples, smoothing unit 608 may make the determination to perform the second smoothing operation in various ways. For example, smoothing unit 608 may use the example operations illustrated in FIGS. 12-17 to make the determination to perform the second smoothing operation. In this example, smoothing unit 608 may make the determination to apply the second smoothing operation to samples in the transition zone if the size of the CU is 8×8 and if the inter-prediction direction of the CU is a bi-predicted CU. Thus, when smoothing unit 608 performs operation 1800, smoothing unit 608 may determine whether to perform smoothing operations based on combinations of the operations described above.

After performing the first smoothing operation, performing the second smoothing operation, or after making the determination not to perform the second smoothing operation, smoothing unit 608 may output a syntax element that indicates which, if any, smoothing operation was performed on samples in the transition zone (1814). Motion compensation unit 604 in encoding unit 104 may use this syntax element when reconstructing the CU as part of a reference frame. In addition, motion compensation unit 702 in decoding unit 106 may use this syntax element when reconstructing a prediction block for the CU.

The first and second smoothing operations may be the same or different types of smoothing operations. For example, a first smoothing kernel configures the first smoothing operation and second smoothing kernel may configure the second smoothing operation. In this example, the kernels define the type and extent of smoothing performed by smoothing filters. In this example, smoothing unit 608 may make the determination whether to perform the first smoothing operation based on a size of a transform, a size of a PU of the CU, an amplitude of a motion vector determined for a neighboring PU and a predicted motion vector. In this example, the motion vector predicted from one or more of the motion vectors determined for the neighboring prediction unit and a motion vector determined for a prediction unit co-located in the reference frame.

In another example, the first smoothing operation may be an OBMC-based smoothing operation and the second smoothing operation may be a filter-based smoothing operation. Because the first and second smoothing operations may be different types of smoothing operations, the first smoothing operation and the second smoothing operation may produce versions of the prediction block that differ from one another.

Figure 19:
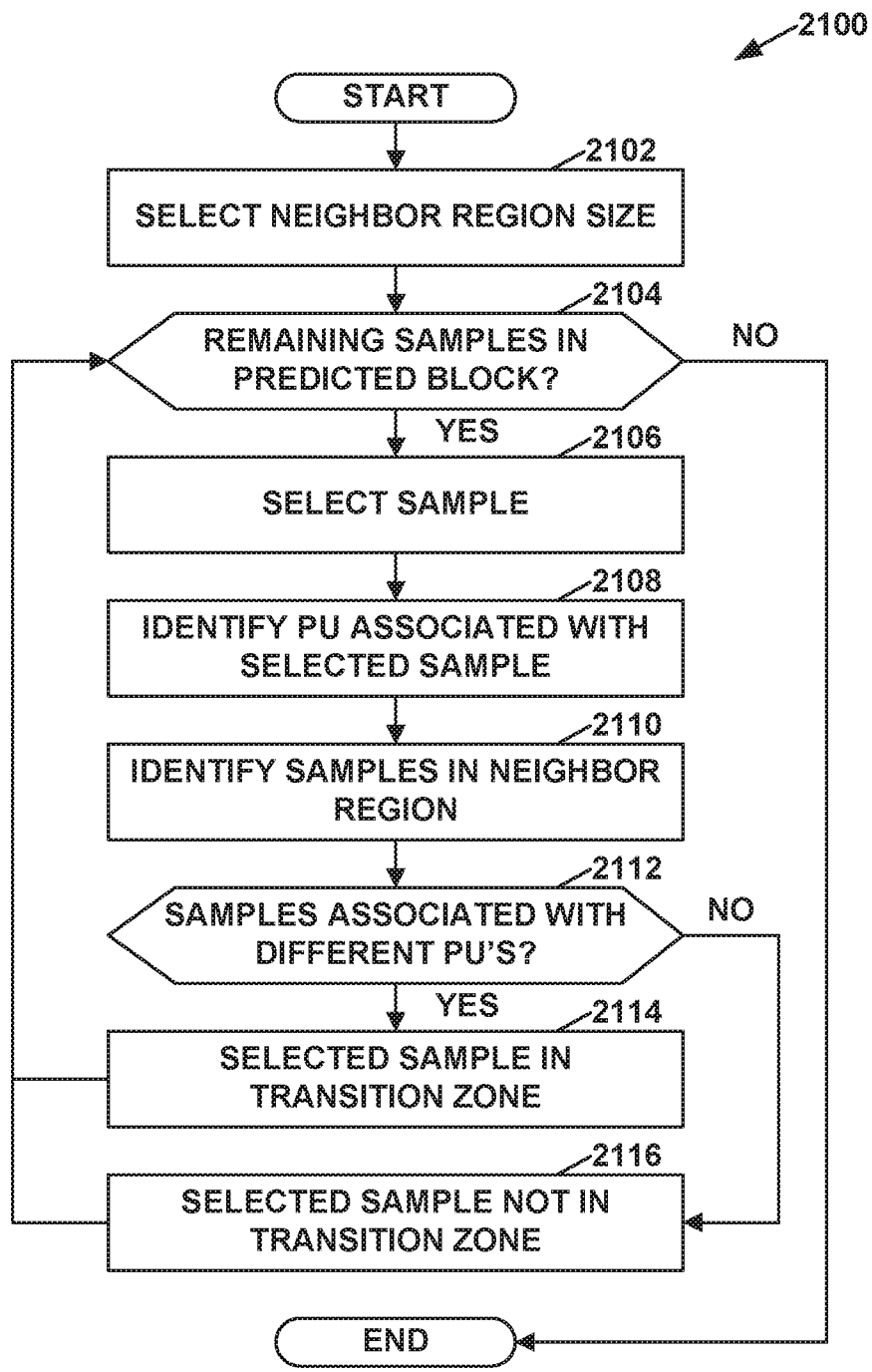
FIG. 19 is a flowchart that illustrates an example transition sample identification operation.

FIG. 19 is a flowchart that illustrates an example transition sample identification operation 2100. Smoothing unit 608 may perform transition sample identification operation 2100 to identify samples in a transition zone of a prediction block. After smoothing unit 608 starts transition sample identification operation 2100, smoothing unit 608 selects the size of a neighbor region (2102). In other words, smoothing unit 608 selects a neighbor region size. In various examples, smoothing unit 608 may select various neighbor region sizes. For example, smoothing unit 608 may select 3×3, 5×5, 7×7, or another size as the neighbor region size.

In various examples, smoothing unit 608 selects the neighbor region size in various ways. For example, encoding unit 104 and decoding unit 106 may store a pre-determined neighbor region size syntax element that indicates a size. In this example, encoding unit 104 and decoding unit 106 read the neighbor region size syntax element and use the neighbor region size syntax element to select the neighbor region size.

In another example, encoding unit 104 stores a neighbor region size parameter that indicates a size. In some examples, encoding unit 104 and/or decoding unit 106 receives the neighbor region size parameter from a human user. In other examples, the neighbor region size parameter is set programmatically. Encoding unit 104 uses the neighbor region size parameter to select the neighbor region size. In addition, encoding unit 104 signals the neighbor region size to decoding unit 106. For example, encoding unit 104 may output a syntax element in a picture parameter set (PPS) or a slice parameter set (SPS) that indicates the neighbor region size.

In another example, encoding unit 104 may, prior to smoothing unit 608 performing the transition sample identification operation 2100, select the neighbor region size for a frame of multimedia content, a group of pictures that includes a current frame, another CU, a group of CUs, a group of sub-CUs, a slice of the current frame, two or more portions of the current frame, or another part of multimedia content. In this example, encoding unit 104 may select the neighbor region size based on certain criteria, and explicitly signal the selected neighbor size to a decoder. Smoothing unit 608 selects the neighbor region size based on the neighbor region size previously selected for the part of multimedia content associated with the CU.

In yet another example, smoothing unit 608 may select the neighbor region size based on characteristics of the CU. In various examples, smoothing unit 608 may select the neighbor region size based on various characteristics of the CU. For example, smoothing unit 608 may select the neighbor region size based on a size of the CU. In another example, smoothing unit 608 may select the neighbor region size based on a motion vector of a PU in the CU. In this example, smoothing unit 608 may select the neighbor region size based on an amplitude of the motion vector. In yet another example, smoothing unit 608 may select the neighbor region size based on a prediction mode (i.e., skip mode, direct mode, inter-frame mode, or intra-frame mode) of a PU of the CU. In yet another example, smoothing unit 608 may select the neighbor region size based on differences in samples in the prediction block.

In yet another example, smoothing unit 608 may select the neighbor region size based on the results of encoding other CUs in the video data. For example, smoothing unit 608 may determine that prediction blocks generated for other CUs using a larger neighbor region size result in less distortion than prediction blocks generated using smaller neighbor region sizes, or vice versa. In other examples, the neighbor region size may be determined based on the partition modes of the previous encoded CU, the partition modes of the previous encoded CUs, the motion vectors of the previous encoded CUs. Based on this determination, smoothing unit 608 may select a neighbor region size that tends to produce prediction blocks with the lowest levels of distortion.

After selecting the neighbor region size, smoothing unit 608 identifies samples in the transition zone. As described below, the transition zone includes a sample associated with a given PU of the CU when a neighbor region contains the sample and also contains a sample of the prediction block that is associated with another PU of the CU. The neighbor region has the selected neighbor region size. To identify the samples in the transition zone, smoothing unit 608 may determine whether there are any remaining samples in the prediction block (2104). If there are one or more remaining samples in the prediction block ("YES" of 2104), smoothing unit 608 selects one of the remaining samples (2106). After smoothing unit 608 selects the sample, smoothing unit 608 does not consider the sample to be a remaining sample of the prediction block. Smoothing unit 608 then identifies the PU associated with the selected sample (2108).

Next, smoothing unit 608 identifies samples in a neighbor region (2110). The neighbor region is a zone of the prediction block that has the selected neighbor region size and that contains the selected sample (2110). In some examples, the neighbor region is centered on the selected sample. For example, if the neighbor region is a 3×3 square, the selected sample would be the central sample of the 3×3 square. In another example, the neighbor region is not centered on the selected sample. For example, if the neighbor region is a 3×3 square, the selected sample may be on a top, bottom, left, or right edge of the 3×3 square. Thus, if the neighbor region is not centered on the selected sample, the transition zone may extend further into one PU than the other PU.

In some examples, inter-prediction unit 304 may use smoothing unit 608 to perform transition sample identification operation 2100 multiple times. For example, smoothing unit 608 may perform transition sample identification operation 2100 once with neighbor regions centered on selected samples and once with neighbor regions not centered on selected zones. Inter-prediction unit 304 may evaluate whether the prediction block has less distortion when the neighbor regions are centered on selected samples or when the neighbor regions are not centered on selected samples. Inter-prediction unit 304 may select the prediction block having less distortion.

After identifying the samples in the neighbor region, smoothing unit 608 determines whether any of the samples in the neighbor region are in a different PU than the selected sample (2112). If any of the samples in the neighbor region are in a different PU than the selected sample ("YES" of 2112), smoothing unit 608 identifies the selected sample as being in the transition zone (2114). Otherwise, if none of the samples in the neighbor region are in a different PU than the selected sample ("NO" of 2112), smoothing unit 608 does not identify the selected sample as being in the transition zone (2116). In either case, smoothing unit 608 may again determine whether there are remaining samples in the prediction block (2104).

If there are remaining samples in the prediction block, smoothing unit 608 may repeat steps 2106, 2108, 2110, 2112, 2114, and 2116 with regard to the remaining samples in the prediction block. If there are no remaining samples in the prediction block ("NO" of 2104), smoothing unit 608 ends transition sample identification operation 2100.

Figure 20:
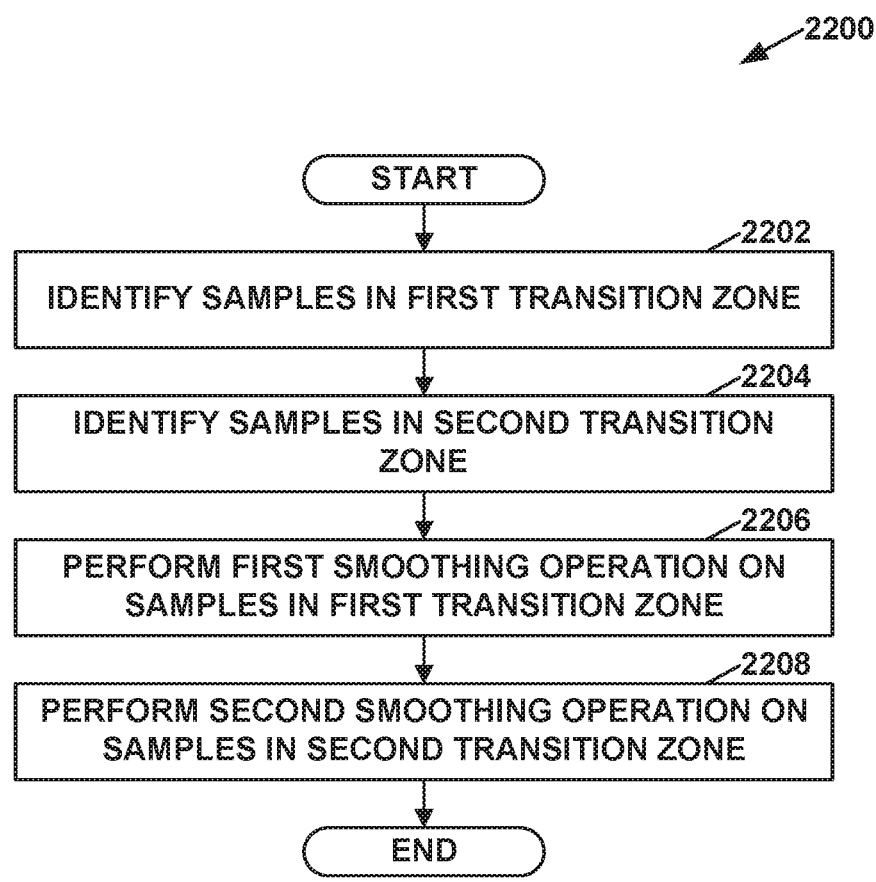
FIG. 20 is a flowchart that illustrates another example operation of a smoothing unit.

FIG. 20 is a flowchart that illustrates another example operation 2200 of smoothing unit 608. After smoothing unit 608 starts operation 2200, smoothing unit 608 identifies samples in a first transition zone of a prediction block of a CU (2202). In various examples, smoothing unit 608 identifies the samples in the first transition zone in various ways. For example, smoothing unit 608 may test samples in the prediction block. When smoothing unit 608 tests a given sample, smoothing unit 608 may determine whether samples in a neighbor region are associated with a different PU of the CU than the given sample. In this example, the neighbor region may have various sizes. For example, the neighbor region may be a 3×3 square.

Smoothing unit 608 then identifies samples in a second transition zone of the prediction block (2204). In various examples, smoothing unit 608 identifies the samples in the second transition zone in various ways. For example, smoothing unit 608 may test samples in the prediction block. In this example, when smoothing unit 608 tests a given sample, smoothing unit 608 determines whether samples in a neighbor region are associated with a different PU of the CU than the given sample. In this example, smoothing unit 608 may identify samples of the prediction block in a second transition zone, wherein samples associated with a first PU of the CU are in the second transition zone if neighbor regions that contain the samples contain samples associated with a second PU of the CU. In this example, samples associated with the second PU are in the second transition zone if neighbor regions that contain the samples contain samples associated with the first PU. In this example, the neighbor region is a zone of the prediction block that includes the given sample. The size of the neighbor region may be different than the size of the neighbor regions used to identify samples in the first transition zone. For example, the size of the neighbor region used to identify samples in the first transition zone may be 3×3 and the size of the neighbor region used to identify samples in the second transition zone may be 5×5.

Smoothing unit 608 then performs a first smoothing operation on samples in the first transition zone (2206). Smoothing unit 608 performs a second smoothing operation on samples in the second transition zone (2208). The second smoothing operation may be different than the first smoothing operation. For example, the first and second smoothing operations may both be OBMC-based smoothing operations. However, in this example, the OBMC-based smoothing operations may blend predicted samples differently. For example, the OBMC-based smoothing operation may use different weights for predictions from different PUs. For instance, in this example, if a sample is associated with a first PU of the CU and is also in the first transition zone, smoothing unit 608 may use a weight ¾ for a prediction from the first PU and weight of ¼ for a prediction from the second PU of the CU. In this example, if a sample is associated with the first PU and is also in the second transition zone, smoothing unit 608 may use a weight of ⅞ for the prediction from the first PU and a weight of ⅛ for the prediction from the second PU. In another example, one of the smoothing operations may be an OBMC-based smoothing operation and one of the smoothing operations may be a filter-based smoothing operation. In yet another example, the first and second smoothing operations may both be filter-based smoothing operations. However, in this example, the filters used in the first and second smoothing operations may be different.

In this way, smoothing unit 608 may smooth different parts of the prediction block in different ways. This may result in greater coding efficiency and/or lower amounts of distortion.

Figure 21:
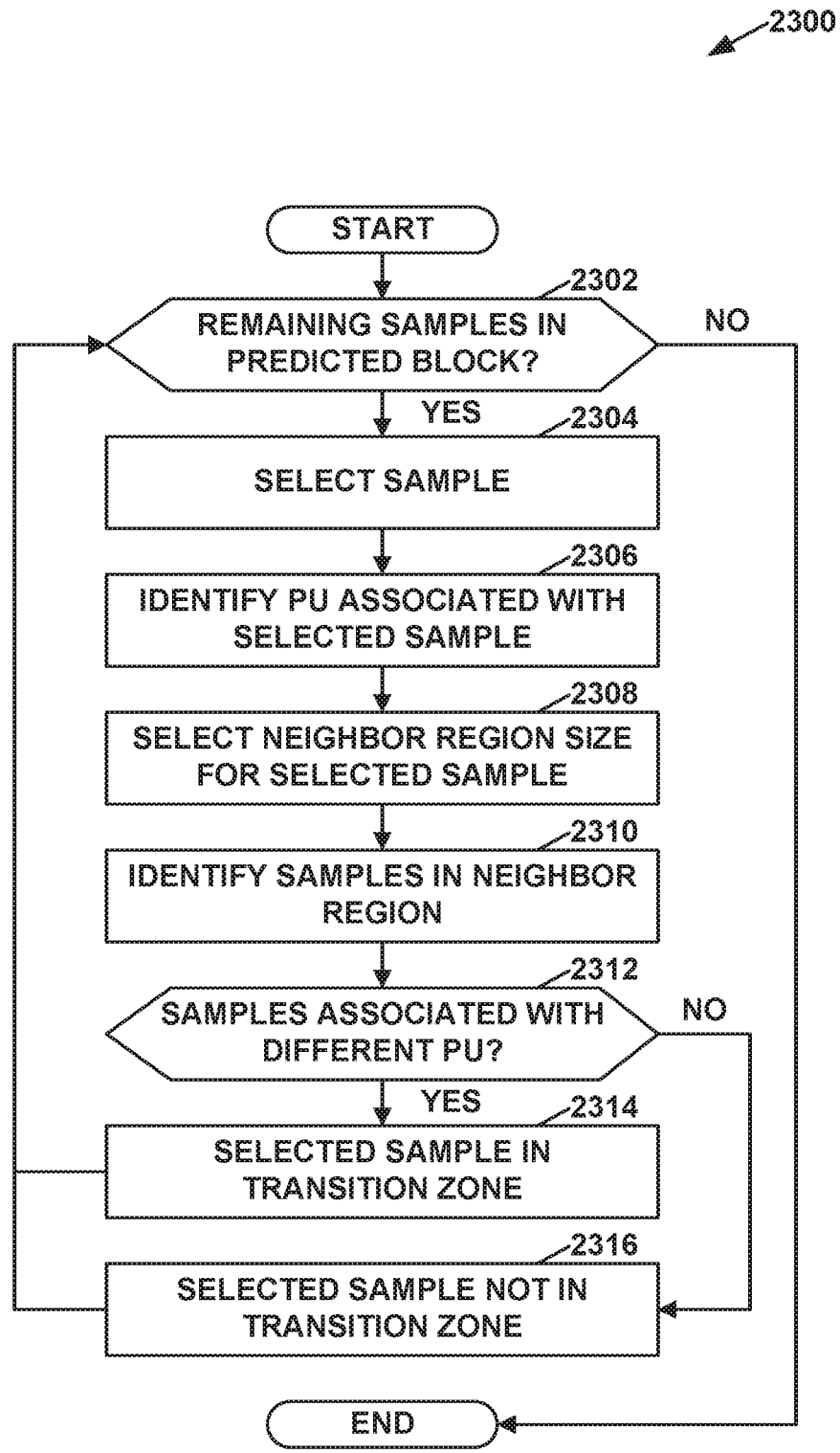
FIG. 21 is a flowchart that illustrates another example transition sample identification operation.

FIG. 21 is a flowchart that illustrates another example transition sample identification operation 2300. Smoothing unit 608 may perform transition sample identification operation 2300 to identify samples in a transition zone of a prediction block of a CU. After smoothing unit 608 starts transition sample identification operation 2300, smoothing unit 608 determines whether there are any remaining samples in the prediction block (2302). If there are one or more remaining samples in the prediction block ("YES" of 2304), smoothing unit 608 selects one of the remaining samples (2304). After smoothing unit 608 selects the sample, smoothing unit 608 does not consider the sample to be a remaining sample of the prediction block. Smoothing unit 608 then identifies a PU of the CU associated with the selected sample (2306).

Next, smoothing unit 608 selects a neighbor region size associated with the PU associated with the selected sample (2308). Different PUs may be associated with different neighbor region sizes. For example, a CU may have a first PU and a second PU. In this example, the first PU may be associated with a neighbor region size of 3×3 samples and the second region PU may be associated with a neighbor region size of 5×5 samples. In this example, if the selected sample is associated with the first PU, smoothing unit 608 selects the neighbor region size of 3×3 samples. In this example, if the selected sample is associated with the second PU, smoothing unit 608 selects the neighbor region size of 5×5 samples.

In various examples, PUs may be associated with neighbor region sizes in various ways. For example, encoding unit 104 and decoding unit 106 may store and/or receive data that separately indicates the neighbor region sizes associated with the PUs. In another example, encoding unit 104 and decoding unit 106 may store and/or receive data that indicate a neighbor region size associated with a first PU. In this example, encoding unit 104 and decoding unit 106 may derive the neighbor region size associated with a second PU from the neighbor region size associated with the first PU.

Smoothing unit 608 then identifies samples in a neighbor region (2310). The neighbor region is a zone of the prediction block that has the selected neighbor region size and that contains the selected sample. Similar to the example transition sample identification operation 2100 discussed above, the neighbor region may be centered on the selected sample or not be centered on the selected sample.

After identifying the samples in the neighbor region, smoothing unit 608 determines whether any of the samples in the neighbor region are associated with a different PU than the selected sample (2312). If any of the samples in the neighbor region are associated with a different PU than the selected sample ("YES" of 2312), smoothing unit 608 identifies the selected sample as being in the transition zone (2314). Otherwise, if none of the samples in the neighbor region are associated with a different PU than the selected sample ("NO" of 2312), smoothing unit 608 does not identify the selected sample as being in the transition zone (2316). In either case, smoothing unit 608 may again determine whether there are remaining samples in the prediction block (2302).

If there are remaining samples in the prediction block, smoothing unit 608 may repeat steps 2304, 2306, 2308, 2310, 2312, 2314, and 2316 with regard to the remaining samples in the prediction block. If there are no remaining samples in the prediction block ("NO" of 2302), smoothing unit 608 ends transition sample identification operation 2300.

In some instances, the transition sample identification operation 2300 implements a method that comprises generating a prediction block for a CU in a frame of video data, the CU having a first PU and a second PU. The method also comprises selecting a first sample in the prediction block and determining that the first sample is associated with the first PU. The method also comprises selecting, by a computing device, a first neighbor region size by determining that the first PU is associated with the first neighbor region size. The method also comprises identifying the first sample as being within the first transition zone when a neighbor region having the first neighbor region size contains the first sample and also contains a sample associated with the second PU. The method also comprises selecting a second sample in the prediction block, determining that the second sample is associated with the second PU, and determining that the second PU is associated with a second neighbor region size. The second neighbor region size is different than the first neighbor region size. The method also comprises identifying the second sample as being within the first transition zone when a neighbor region having the second neighbor region size contains the second sample and also contains a sample associated with the first PU. The method also comprises performing a first smoothing operation on the samples in the first transition zone.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the invention defined by the following claims.

What is claimed is:

1. A method of decoding video data, the method comprising:
receiving an indication of a coding unit (CU) of video data to be decoded, prediction parameters associated with a first prediction unit (PU) of the CU, a size of a CU, and prediction parameters associated with a second PU of the CU, wherein the prediction parameters associated with the first PU include first motion information;
receiving one or more parameters indicative of a geometric partitioning mode associated with the CU, wherein the indicated geometric partitioning mode corresponds to a non-perpendicular partitioning line that separates first samples to be predicted that are associated with the first PU and second samples to be predicted that are associated with the second PU; and
generating a prediction block for the CU using the indicated geometric partitioning mode, comprising:
identifying a first prediction block of samples based on the prediction parameters associated with the first PU;
identifying a second prediction block of samples based on the prediction parameters associated with the second PU;
identifying a transition zone of samples from the first prediction block of samples and the second prediction block of samples based on the non-perpendicular partitioning line and the size of the CU, wherein identifying the transition zone comprises, for each respective sample of the first PU:
determining whether any sample in a respective 2-dimensional region of samples for the respective sample of the first PU is in the second PU, wherein the respective 2-dimensional region of samples for the respective sample of the first PU is centered on the respective sample of the first PU and has a region size determined based on the size of the CU; and
identifying whether the respective sample of the first PU is in the transition zone, wherein the respective sample of the first PU is identified as being in the transition zone in response to determining a sample in the respective 2-dimensional region of samples for the respective sample of the first PU is in the second PU and the respective sample of the first PU is identified as not being in the transition zone in response to determining no sample in the respective 2-dimensional region of samples for the respective sample of the first PU is in the second PU;
identifying a plurality of first weights and a plurality of second weights corresponding to the identified transition zone; and
for each sample position of the prediction block for the CU to be predicted, applying a weighted sum of pixel values from the first prediction block of samples and the second prediction block of samples to produce a predicted sample.

2. The method according to claim 1, wherein the prediction parameters associated with the second PU include second motion information, and the applied weighted sum of pixel values from the first prediction block of samples and the second prediction block of samples corresponds to a calculated weighted average of first motion compensated prediction associated with the first PU and second motion compensated prediction associated with the second PU.

3. The method according to claim 1, wherein the applied weighted sum for each sample position of the prediction block for the CU to be predicted provides a filter-based smoothing operation to the video prediction samples in the transition zone corresponding to one or more predetermined filters.

4. The method according to claim 3, wherein each of the one or more predetermined filters is a predetermined set of weights set forth in a predetermined table.

5. The method according to claim 3, wherein each of the one or more predetermined filters is a predetermined set of weights set forth in a predetermined table such that each of the plurality of weights increases in value with respect to distance from the non-perpendicular partitioning line.

6. The method according to claim 1, further comprising:
receiving an indication for rectangularly partitioning a frame of the video data into a plurality of treeblocks, wherein the treeblocks are rectangularly partitioned into a hierarchy of progressively smaller sample blocks, said hierarchy representing a hierarchical tree structure;
receiving an indication of further partitioning the progressively smaller sample blocks into leaf nodes, with each of the leaf nodes corresponding to a respective prediction block for a respective CU of a plurality of CUs; and
generating a prediction block for each CU of the plurality of CUs.

7. The method according to claim 6, wherein each of the respective prediction blocks for each CU of the plurality of CUs may vary in size, further comprising:
selectively executing said method if the respective prediction block is 8×8.

8. The method according to claim 6, wherein each of the respective prediction blocks for each CU of the plurality of CUs may vary in size, further comprising:
selectively executing said method if the respective prediction block is 32×32 or 16×16.

9. The method according to claim 6, wherein each of the respective prediction blocks for each CU of the plurality of CUs may vary in size, further comprising:
selectively executing said method if the respective prediction block is 64×64.

10. The method according to claim 1, wherein for each sample position of the prediction block for the CU to be predicted, said applying operation is adaptively executed in instances to enhance visual quality or compression performance.

11. The method according to claim 1, for each sample position of the prediction block for the CU to be predicted, said applying operation is adaptively executed based on the size of the CU.

12. The method according to claim 1, wherein the one or more parameters indicative of the geometric partitioning mode associated with the CU, comprises at least two parameters such that the non-perpendicular partitioning line is designated by the at least two parameters.

13. The method according to claim 12, wherein the parameters indicative of the geometric partitioning mode associated with the CU indicate an angle and define a location of the non-perpendicular partitioning line.

14. A computing device that decodes video data, the computing device comprising:
a storage medium configured to store a reconstructed sample block for a coding unit (CU) of a picture of the video data; and a processor in communication with the storage medium, wherein the processor is configured to:
receive an indication of the CU, prediction parameters associated with a first prediction unit (PU) of the CU, a size of a CU, and prediction parameters associated with a second PU of the CU, wherein the prediction parameters associated with the first PU include first motion information;
receive one or more parameters indicative of a geometric partitioning mode associated with the CU, wherein the indicated geometric partitioning mode corresponds to a non-perpendicular partitioning line that separates first samples to be predicted that are associated with the first PU and second samples to be predicted that are associated with the second PU; and
generate a prediction block for the CU using the indicated geometric partitioning mode, the processor further configured to:
identify a first prediction block of samples based on the prediction parameters associated with the first PU;
identify a second prediction block of samples based on the prediction parameters associated with the second PU;
identify a transition zone of samples from the first prediction block of samples and the second prediction block of samples based on the non-perpendicular partitioning line and the size of the CU, wherein the processor is configured such that, as part of identifying the transition zone, the processor, for each respective sample of the first PU:
determines whether any sample in a respective 2-dimensional region of samples for the respective sample of the first PU is in the second PU, wherein the respective 2-dimensional region of samples for the respective sample of the first PU is centered on the respective sample of the first PU and has a region size determined based on the size of the CU; and
identifies whether the respective sample of the first PU is in the transition zone, wherein the respective sample of the first PU is identified as being in the transition zone in response to determining a sample in the respective 2-dimensional region of samples for the respective sample of the first PU is in the second PU and the respective sample of the first PU is identified as not being in the transition zone in response to determining no sample in the respective 2-dimensional region of samples for the respective sample of the first PU is in the second PU;
identify a plurality of first weights and a plurality of second weights corresponding to the identified transition zone; and
for each sample position of the prediction block for the CU to be predicted, apply a weighed weighted sum of pixel values from the first prediction block of samples and the second prediction block of samples to produce a predicted sample; and
use reconstructed residual data of the CU and the prediction block for the CU to generate the reconstructed sample block for the CU.

15. The computing device according to claim 14, wherein the prediction parameters associated with the second PU include second motion information, and the applied weighted sum of pixel values from the first prediction block of samples and the second prediction block of samples corresponds to a calculated weighted average of first motion compensated prediction associated with the first PU and second motion compensated prediction associated with the second PU.

16. The computing device according to claim 14, wherein the applied weighted sum for each sample position of the prediction block for the CU to be predicted provides a filter-based smoothing operation to the video prediction samples in the transition zone corresponding to one or more predetermined filters.

17. The computing device according to claim 16, wherein each of the one or more predetermined filters is a predetermined set of weights set forth in a predetermined table.

18. The computing device according to claim 16, wherein each of the one or more predetermined filters is a predetermined set of weights set forth in a predetermined table such that each of the plurality of weights increases in value with respect to distance from the non-perpendicular partitioning line.

19. The computing device according to claim 14, the processor further configured to:
receive an indication for rectangularly partitioning a frame of the video data into a plurality of treeblocks, wherein the treeblocks are rectangularly partitioned into a hierarchy of progressively smaller sample blocks, said hierarchy representing a hierarchical tree structure;
receive an indication of further partitioning the progressively smaller sample blocks into leaf nodes, with each of the leaf nodes corresponding to a respective prediction block for a respective CU of a plurality of CUs; and
generate a prediction block for each CU of the plurality of CUs.

20. The computing device according to claim 19, wherein each of the respective predictions blocks for each CU of the plurality of CUs may vary in size, the processor further configured to:
selectively use the indicated geometric partitioning mode if the respective prediction block is 8×8.

21. The computing device according to claim 19, wherein each of the respective prediction blocks for each CU of the plurality of CUs may vary in size, the processor further configured to:
selectively use the indicated geometric partitioning mode if the respective prediction block is 32×32 or 16×16.

22. The computing device according to claim 19, wherein each of the respective prediction blocks for each CU of the plurality of CUs may vary in size, the processor further configured to:
selectively use the indicated geometric partitioning mode if the respective prediction block is 64×64.

23. The computing device according to claim 14, wherein for each sample position of the prediction block for the CU to be predicted, the weighted sum of pixel values is adaptively applied in instances to enhance visual quality or compression performance.

24. The computing device according to claim 14, for each sample position of the prediction block for the CU to be predicted, the weighted sum of pixel values is adaptively applied based on the size of the CU.

25. The computing device according to claim 14, wherein the one or more parameters indicative of the geometric partitioning mode associated with the CU comprises at least two parameters such that the non-perpendicular partitioning line is designated by the at least two parameters.

26. The computing device according to claim 25, wherein the at least two parameters indicative of the geometric partitioning mode associated with the CU indicate an angle and define a location of the positioning line.

27. The computing device according to claim 14, wherein the computing device comprises at least one of:
an integrated circuit;
a microprocessor; or
a wireless communication device.

28. The computing device according to claim 14, further comprising a display configured to display the decoded video data.

29. The computing device according to claim 14, further comprising a camera configured to capture the video data.

30. The computing device according to claim 14, wherein the computing device is a wireless communication device, further comprising:
a receiver configured to receive a bitstream comprising a sequence of bits that forms a representation of coded pictures of the video data.

31. The computing device according to claim 30, wherein the wireless communication device is a cellular telephone and the bitstream is received by the receiver and modulated according to a cellular communication standard.

32. A method of encoding video data, the method comprising:
receiving a sample block of a coding unit (CU) in a frame of the video data;
geometrically partitioning the sample block of the CU into a first area of samples and a second area of samples with respect to a non-perpendicular partitioning line using a geometric partitioning mode, and identifying the non-perpendicular partitioning line by one or more partitioning line parameters;
performing motion estimation with respect to the first area to generate first prediction parameters associated with a first prediction unit (PU) of the CU, wherein the first prediction parameters include a first motion vector;
performing motion estimation with respect to the second area to generate second prediction parameters associated with a second prediction unit (PU) of the CU;
identifying a transition zone of samples from the first area and the second area based on the non-perpendicular partitioning line and a size of the CU, wherein identifying the transition zone comprises, for each respective sample of the first PU:
determining whether any sample in a respective 2-dimensional region of samples for the respective sample of the first PU is in the second PU, wherein the respective 2-dimensional region of samples for the respective sample of the first PU is centered on the respective sample of the first PU and has a region size determined based on the size of the CU; and
identifying whether the respective sample of the first PU is in the transition zone, wherein the respective sample of the first PU is identified as being in the transition zone in response to determining a sample in the respective 2-dimensional region of samples for the respective sample of the first PU is in the second PU and the respective sample of the first PU is identified as not being in the transition zone in response to determining no sample in the respective 2-dimensional region of samples for the respective sample of the first PU is in the second PU;
identifying a plurality of first weights and a plurality of second weights corresponding to the identified transition zone; and for each sample position of the sample block of the CU,
determining a first pixel value corresponding to the first prediction parameters,
determining a second pixel value corresponding to the second prediction parameters, and
applying a weighted sum of the first prediction values and the second prediction values of samples to produce a prediction block for the CU.

33. The method of encoding according to claim 32, wherein the second prediction parameters include a second motion vector, the method further comprising:
subtracting the predicted block for the CU from the sample block of the CU to generate residual data; and
transmitting the first prediction parameters, the second prediction parameters, the first motion vector, the second motion vector, the one or more partitioning line parameters, and the residual data as an encoded CU of the video data.

34. The method according to claim 32, wherein the second prediction parameters include second motion information, and the predicted block for the CU corresponds to a calculated weighted average of first motion compensated prediction associated with the first PU and second motion compensated prediction associated with the second PU.

35. The method according to claim 32, wherein the applied weighted sum for each sample position of the prediction block for the CU to be predicted provides a filter-based smoothing operation to the samples in the transition zone corresponding to one or more predetermined filters.

36. The method according to claim 35, wherein each of the one or more predetermined filters is a set of predetermined weights set forth in a predetermined table.

37. The method according to claim 35, wherein each of the one or more predetermined filters is a set of predetermined weights set forth in a predetermined table such that each of the plurality of weights increases in value with respect to distance from the non-perpendicular partitioning line.

38. The method according to claim 32, further comprising:
determining an indication for rectangularly partitioning the frame of the video data into a plurality of treeblocks, wherein the treeblocks are rectangularly partitioned into a hierarchy of progressively smaller sample blocks, said hierarchy representing a hierarchical tree structure;
determining an indication of further partitioning the progressively smaller sample blocks into leaf nodes, with each of the leaf nodes corresponding to a respective prediction block for a respective CU of a plurality of CUs; and
generating a sample block for each CU of the plurality of CUs.

39. The method according to claim 38, wherein each of the respective sample blocks for each CU of the plurality of CUs may vary in size, further comprising:
selectively executing said method if the respective sample block is 8×8.

40. The method according to claim 38, wherein each of the respective sample blocks for each CU of the plurality of CUs may vary in size, further comprising:
selectively executing said method if the respective sample block is 32×32 or 16×16.

41. The method according to claim 38, wherein each of the respective sample blocks for each CU of the plurality of CUs may vary in size, further comprising:

selectively executing said method if the respective sample block is 64×64.

42. The method according to claim 32, wherein for each sample position of the sample block of the CU, said applying operation is adaptively executed in instances to enhance visual quality or compression performance.

43. The method according to claim 32, for each sample position of the sample block of the CU, said applying operation is adaptively executed based on the size of the CU.

44. The method according to claim 32, further comprising signaling the partitioning line parameters, the partitioning line parameters comprising at least two parameters such that the non-perpendicular partitioning line is designated by the at least two parameters.

45. The method according to claim 44, wherein the partitioning line parameters indicate an angle and define a location of the non-perpendicular partitioning line.

46. A computing device that encodes video data, the computing device comprising:
   a storage medium configured to store a sample block of a coding unit (CU) of a picture of the video data; and
   a processor in communication with the storage medium, wherein the processor is configured to:
      receive the sample block of the CU;
      geometrically partition the sample block of the CU into a first area of samples and a second area of samples with respect to a non-perpendicular partitioning line using a geometric partitioning mode, and identifying the non-perpendicular partitioning line by one or more partitioning line parameters;
      perform motion estimation with respect to the first area to generate first prediction parameters associated with a first prediction unit (PU) of the CU, wherein the first prediction parameters include a first motion vector;
      perform motion estimation with respect to the second area to generate second prediction parameters associated with a second prediction unit (PU) of the CU;
      identify a transition zone of samples from the first area and the second area based on the non-perpendicular partitioning line and a size of the CU, wherein the processor is configured such that, as part of identifying the transition zone, the processor, for each respective sample of the first PU:
         determines whether any sample in a respective 2-dimensional region of samples for the respective sample of the first PU is in the second PU, wherein the respective 2-dimensional region of samples for the respective sample of the first PU is centered on the respective sample of the first PU and has a region size determined based on the size of the CU; and
         identifies whether the respective sample of the first PU is in the transition zone, wherein the respective sample of the first PU is identified as being in the transition zone in response to determining a sample in the respective 2-dimensional region of samples for the respective sample of the first PU is in the second PU and the respective sample of the first PU is identified as not being in the transition zone in response to determining no sample in the respective 2-dimensional region of samples for the respective sample of the first PU is in the second PU; and
      for each sample position of the sample block of the CU, the processor is further configured to:
         determine a first pixel value corresponding to the first prediction parameters,
         determine a second pixel value corresponding to the second prediction parameters, and
         apply a weighted sum of the first prediction values and the second prediction values of samples to produce a prediction block for the CU.

47. The computing device according to claim 46, wherein the second prediction parameters include a second motion vector and the processor is further configured to:
   subtract the predicted sample block from the sample block of the CU to generate residual data; and
   transmit the first prediction parameters, the second prediction parameters, the first motion vector, the second motion vector, the one or more partitioning line parameters, and the residual data as an encoded CU of the video data.

48. The computing device according to claim 46, wherein the second prediction parameters include second motion information, and the predicted sample corresponds to a calculated weighted average of first motion compensated prediction associated with the first PU and second motion compensated prediction associated with the second PU.

49. The computing device according to claim 46, wherein the applied weighted sum for each sample position of the prediction block for the CU to be predicted provides a filter-based smoothing operation to the samples in the transition zone corresponding to one or more predetermined filters.

50. The computing device according to claim 49, wherein each of the one or more predetermined filters is a set of predetermined weights set forth in a predetermined table.

51. The computing device according to claim 49, wherein each of the one or more predetermined filters is a set of predetermined weights set forth in a predetermined table such that each of the plurality of weights increases in value with respect to distance from the non-perpendicular partitioning line.

52. The computing device according to claim 49, wherein the processor is further configured to:
   determine an indication for rectangularly partitioning a frame of the video data into a plurality of treeblocks, wherein the treeblocks are rectangularly partitioned into a hierarchy of progressively smaller sample blocks, said hierarchy representing a hierarchical tree structure;
   determine an indication of further partitioning the progressively smaller sample blocks into leaf nodes, with each of the leaf nodes corresponding to a respective prediction block for a respective CU of the plurality of CUs; and
   generate a sample block for each CU of the plurality of CUs.

53. The computing device according to claim 52, wherein each of the respective sample blocks for each CU of the plurality of CUs may vary in size, the processor further configured to:
   selectively use the geometric partitioning mode if the respective sample block is 8×8.

54. The computing device according to claim 52, wherein each of the respective sample blocks for each CU of the plurality of CUs may vary in size, the processor further configured to:
   selectively use the geometric partitioning mode if the respective sample block is 32×32 or 16×16.

55. The computing device according to claim 52, wherein each of the respective sample blocks for each CU of the plurality of CUs may vary in size, the processor further configured to:
   selectively use the geometric partitioning mode if the respective sample block is 64×64.

56. The computing device according to claim 49, wherein for each sample position of the sample block of the CU, the processor is further configured to adaptively execute the geometric partitioning mode in instances to enhance visual quality or compression performance.

57. The computing device according to claim 49, for each sample position of the sample block of the CU, the processor is further configured to adaptively execute the geometric partitioning mode based on the size of the CU.

58. The computing device according to claim 49, wherein the processor is configured to signal the one or more partitioning line parameters, the partitioning line parameters comprising at least two parameters such that the non-perpendicular partitioning line is designated by the at least two parameters.

59. The computing device according to claim 58, wherein the partitioning line parameters indicate an angle and define a location of the non-perpendicular partitioning line.

* * * * *